(12) United States Patent
Sinnet et al.

(10) Patent No.: US 11,577,401 B2
(45) Date of Patent: Feb. 14, 2023

(54) MODULAR ROBOTIC FOOD PREPARATION SYSTEM AND RELATED METHODS

(71) Applicant: Miso Robotics, Inc., Pasadena, CA (US)

(72) Inventors: Ryan W. Sinnet, Pasadena, CA (US); Robert Anderson, Pasadena, CA (US); William Werst, Pasadena, CA (US); David Zito, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 486 days.

(21) Appl. No.: 16/676,088

(22) Filed: Nov. 6, 2019

(65) Prior Publication Data

US 2020/0139554 A1 May 7, 2020

Related U.S. Application Data

(60) Provisional application No. 62/757,268, filed on Nov. 8, 2018, provisional application No. 62/757,147, filed on Nov. 7, 2018.

(51) Int. Cl.
*B25J 11/00* (2006.01)
*B25J 9/16* (2006.01)
(Continued)

(52) U.S. Cl.
CPC ............ *B25J 11/0045* (2013.01); *A23L 5/10* (2016.08); *B25J 9/0081* (2013.01); *B25J 9/162* (2013.01);
(Continued)

(58) Field of Classification Search
CPC ........ B25J 11/0045; B25J 9/162; B25J 5/007; B25J 11/008; B25J 9/0084; B25J 21/00;
(Continued)

(56) References Cited

U.S. PATENT DOCUMENTS

| 4,545,723 A | 10/1985 | Clark |
| 4,853,771 A | 8/1989 | Witriol et al. |

(Continued)

FOREIGN PATENT DOCUMENTS

| JP | 2009106734 A | 5/2009 |
| WO | 0170087 A2 | 9/2001 |

(Continued)

OTHER PUBLICATIONS

B. Siciliano & O. Khatib, Handbook of Robotics, published by Springer-Verlag Berlin (2008).

(Continued)

*Primary Examiner* — Khoi H Tran
*Assistant Examiner* — Tanner L Cullen
(74) *Attorney, Agent, or Firm* — Richard Batt

(57) ABSTRACT

A modular robotic kitchen system is conveniently adaptable to perform a wide range of cooking applications. The modular robotic kitchen system can include a plurality of discrete modular units organized in a small footprint such that multiple types of cooking applications can be performed without a need to replace the modular units. Exemplary modular units include an ingredient module, robotic arm module, assembly and packaging module, and warming module. Optionally a transport unit or sled moves the modules into position. The modular kitchen system includes a central processor operable to carry out different cooking applications upon downloading software corresponding to the specific cooking application and without retooling the existing modules. Related methods are also described.

27 Claims, 21 Drawing Sheets

(51) Int. Cl.
- *B25J 21/00* (2006.01)
- *B25J 9/00* (2006.01)
- *B25J 19/02* (2006.01)
- *A23L 5/10* (2016.01)
- *B25J 9/08* (2006.01)

(52) U.S. Cl.
CPC ............. *B25J 9/1612* (2013.01); *B25J 19/02* (2013.01); *B25J 21/00* (2013.01)

(58) Field of Classification Search
CPC .................. B25J 9/1664; B25J 9/1612; G05B 2219/45111; A23L 5/10; A47J 36/00; A47J 37/00; A47J 44/00; G06Q 50/12
See application file for complete search history.

(56) References Cited

U.S. PATENT DOCUMENTS

| | | | |
|---|---|---|---|
| 4,919,950 | A | 4/1990 | Mak |
| 4,922,435 | A | 5/1990 | Cahlander et al. |
| 5,132,914 | A | 7/1992 | Cahlander et al. |
| 5,285,604 | A | 2/1994 | Carlin |
| 5,386,762 | A | 2/1995 | Gokey |
| 5,389,764 | A | 2/1995 | Nishii et al. |
| 5,458,384 | A | 10/1995 | Liu et al. |
| 5,466,025 | A | 11/1995 | Mee |
| 5,833,295 | A | 11/1998 | Farlow, Jr. |
| 5,893,051 | A | 4/1999 | Tomohiro |
| 7,174,830 | B1 | 2/2007 | Dong |
| 7,920,962 | B2 | 4/2011 | D'Andrea et al. |
| 7,971,450 | B2 | 7/2011 | Furlanetto et al. |
| 8,276,505 | B2 | 10/2012 | Buehler et al. |
| 8,610,037 | B2 | 12/2013 | Polt |
| 8,820,313 | B1 | 9/2014 | Lutes |
| 9,285,589 | B2 | 3/2016 | Osterhout et al. |
| 9,483,875 | B2 | 11/2016 | Theimer et al. |
| 9,542,621 | B2 | 1/2017 | He et al. |
| 9,785,911 | B2 | 10/2017 | Galluzzo et al. |
| 9,815,191 | B2 | 11/2017 | Oleynik et al. |
| 10,005,184 | B2 | 6/2018 | Gerio et al. |
| 10,112,771 | B2 | 10/2018 | D'andrea et al. |
| 10,154,756 | B2 | 12/2018 | Hall et al. |
| 10,293,488 | B2 | 5/2019 | Hall et al. |
| 10,682,765 | B2 | 6/2020 | Mirkhaef et al. |
| 10,919,144 | B2 | 2/2021 | Sinnet et al. |
| 11,167,421 | B2 | 11/2021 | Sinnet |
| 2002/0028127 | A1 | 3/2002 | Hart et al. |
| 2002/0082924 | A1 | 6/2002 | Koether |
| 2004/0111321 | A1 | 6/2004 | Kargman |
| 2004/0154474 | A1 | 8/2004 | Chan |
| 2004/0172380 | A1* | 9/2004 | Zhang .................... B25J 9/1682 |
| 2005/0049940 | A1 | 3/2005 | Tengler et al. |
| 2005/0193901 | A1* | 9/2005 | Buehler .................. A47J 44/00 99/468 |
| 2008/0110347 | A1 | 5/2008 | Wong |
| 2009/0192921 | A1 | 7/2009 | Hicks |
| 2009/0210090 | A1 | 8/2009 | Takemitsu et al. |
| 2010/0132692 | A1 | 6/2010 | Shaffer |
| 2011/0153614 | A1 | 6/2011 | Solomon |
| 2012/0024170 | A1* | 2/2012 | Fritz-Jung ................ B25J 11/00 99/450.1 |
| 2013/0033057 | A1 | 2/2013 | Markham |
| 2013/0275236 | A1 | 10/2013 | Koke et al. |
| 2013/0302483 | A1 | 11/2013 | Riefenstein |
| 2014/0031978 | A1 | 1/2014 | Takata |
| 2014/0089299 | A1 | 3/2014 | Kamei et al. |
| 2014/0157698 | A1 | 6/2014 | Cihak et al. |
| 2014/0184496 | A1 | 7/2014 | Gribetz et al. |
| 2014/0203012 | A1 | 7/2014 | Corona et al. |
| 2014/0324607 | A1 | 10/2014 | Frehn et al. |
| 2014/0334691 | A1 | 11/2014 | Cho et al. |
| 2014/0351068 | A1 | 11/2014 | Renfroe |
| 2014/0363266 | A1 | 12/2014 | Cooper |
| 2015/0019354 | A1 | 1/2015 | Chan et al. |
| 2015/0290795 | A1 | 10/2015 | Oleynik et al. |
| 2016/0078694 | A1 | 3/2016 | Swift |
| 2016/0180546 | A1 | 6/2016 | Kim et al. |
| 2016/0239705 | A1 | 8/2016 | Masood et al. |
| 2016/0307459 | A1 | 10/2016 | Chestnut et al. |
| 2016/0327279 | A1 | 11/2016 | Bhogal et al. |
| 2016/0327281 | A1 | 11/2016 | Bhogal et al. |
| 2016/0334799 | A1 | 11/2016 | D'Andrea et al. |
| 2017/0011319 | A1 | 1/2017 | Elliot et al. |
| 2017/0024789 | A1 | 1/2017 | Frehn et al. |
| 2017/0116661 | A1 | 4/2017 | Sundaram |
| 2017/0130968 | A1 | 5/2017 | Nagraj et al. |
| 2017/0169315 | A1 | 6/2017 | Vaca et al. |
| 2017/0178070 | A1 | 6/2017 | Wang et al. |
| 2017/0206431 | A1 | 7/2017 | Sun et al. |
| 2017/0252922 | A1 | 9/2017 | Levine et al. |
| 2017/0290345 | A1* | 10/2017 | Garden .................... A21C 9/08 |
| 2017/0305015 | A1 | 10/2017 | Krasny et al. |
| 2017/0348854 | A1 | 12/2017 | Oleynik |
| 2017/0364073 | A1 | 12/2017 | Guy |
| 2018/0150661 | A1* | 5/2018 | Hall ........................ B25J 11/008 |
| 2018/0345485 | A1 | 12/2018 | Sinnet et al. |
| 2018/0365630 | A1 | 12/2018 | Seals et al. |
| 2019/0297899 | A1* | 10/2019 | Weiss ........................ A21B 7/00 |
| 2019/0352028 | A1* | 11/2019 | Mirkhaef .............. B25J 11/0045 |
| 2020/0009638 | A1* | 1/2020 | Asada ..................... B25J 9/0093 |
| 2020/0030966 | A1* | 1/2020 | Hasegawa ............ B25J 15/0433 |
| 2020/0046168 | A1 | 2/2020 | Sinnet et al. |
| 2020/0047349 | A1 | 2/2020 | Sinnet et al. |
| 2020/0054175 | A1* | 2/2020 | Roy ........................ B25J 9/0084 |
| 2020/0087069 | A1* | 3/2020 | Johnson ................. B25J 9/0009 |
| 2020/0121125 | A1 | 4/2020 | Zito et al. |
| 2021/0094188 | A1 | 4/2021 | Rodionov et al. |
| 2021/0107724 | A1* | 4/2021 | Cohen ................ B65D 83/0055 |
| 2021/0208171 | A1* | 7/2021 | Guarracina ............ B25J 9/1679 |
| 2021/0276756 | A1* | 9/2021 | Dunkel .................... B65B 9/045 |
| 2021/0394371 | A1* | 12/2021 | Ishizu ................... A47J 43/0711 |

FOREIGN PATENT DOCUMENTS

| | | |
|---|---|---|
| WO | 2006006624 A1 | 1/2006 |
| WO | 2012020858 A1 | 2/2012 |
| WO | 2015100958 A1 | 7/2015 |
| WO | 2015143800 A1 | 10/2015 |
| WO | 2016040361 A1 | 3/2016 |
| WO | 2015125017 A3 | 6/2016 |
| WO | 2017114014 A1 | 7/2017 |
| WO | 2017103682 A3 | 8/2017 |
| WO | 2018031489 A1 | 2/2018 |

OTHER PUBLICATIONS

Beucher, Serge, and Fernand Meyer. "The morphological approach to segmentation: the watershed transformation." Optical Engineering—New Yark-Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

International Preliminary Examination Report dated Jul. 11, 2018 for PCT/US2018/020948.

International Preliminary Examination Report dated Jul. 20, 2018 for PCT/US2018/021066.

Ju Yong Chang, Haesol Park, in Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/...017/03/02/57c95fb0-f55a-11e6-b9c9-e83fce42fb61_story.h tml?horedirect=on&utm_term=.108e357d67 df, (May 21, 2018).

Lucas, Bruce D., and Takeo Kanade. "An iterative image registration technique with an application to stereo vision." (1981): 674-679.

(56) References Cited

OTHER PUBLICATIONS

Ohta, Yu-Ichi, Takeo Kanade, and Toshiyuki Sakai. "Color information for region segmentation." Computer graphics and image processing 13.3 (1980): 222-241.
Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

* cited by examiner

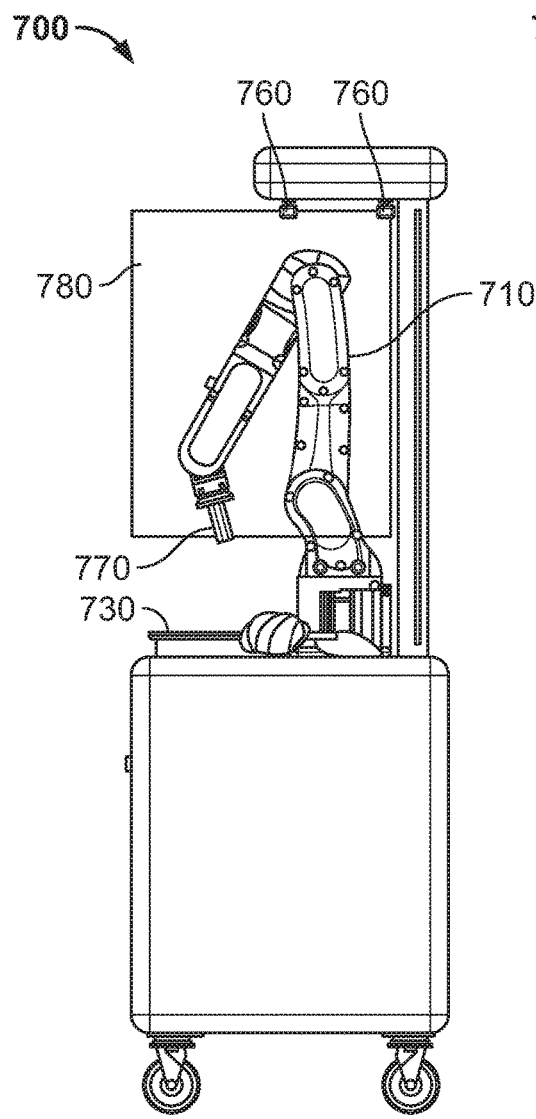
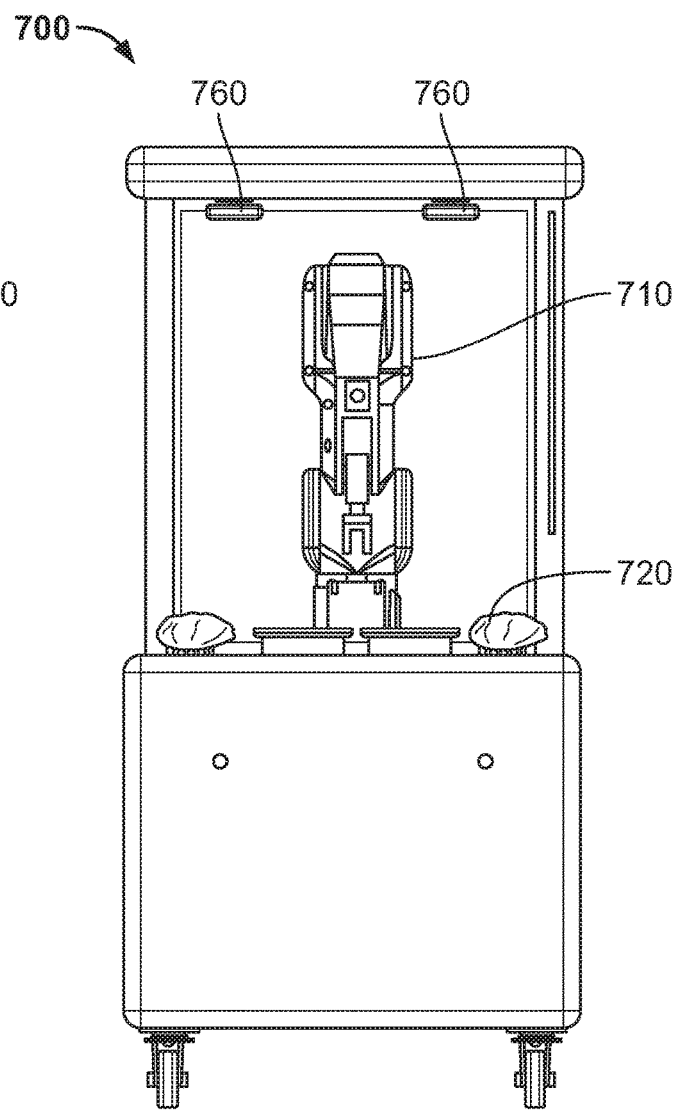
FIG. 15A
FIG. 15B

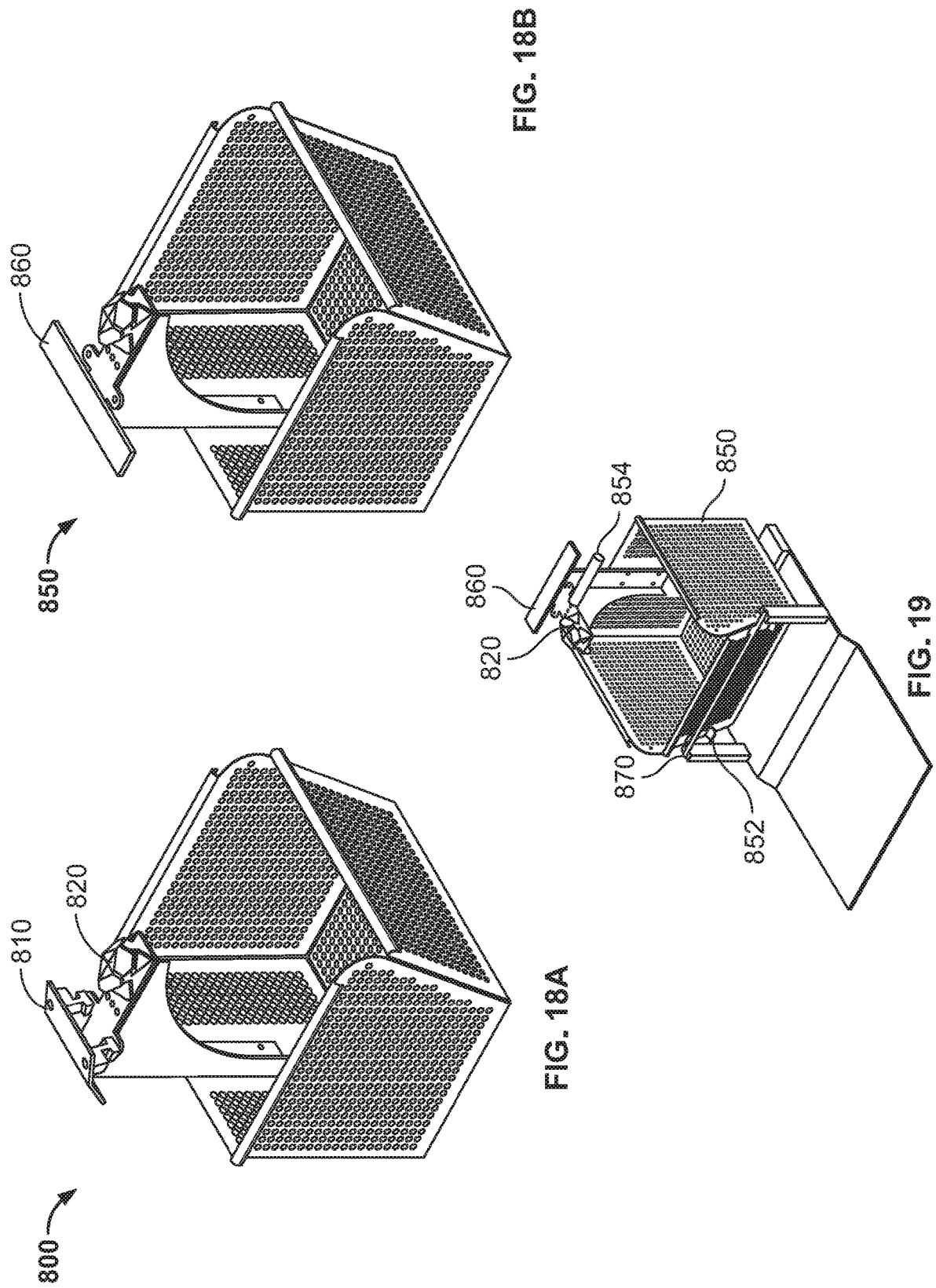

MODULAR ROBOTIC FOOD PREPARATION SYSTEM AND RELATED METHODS

CROSS-REFERENCE TO RELATED APPLICATIONS

This claims priority to application No. 62/757,147, filed Nov. 7, 2018, and entitled "MODULAR ROBOTIC FOOD PREPARATION SYSTEM AND RELATED METHODS", and application No. 62/757,268, filed Nov. 8, 2018, and entitled "MODULAR ROBOTIC FOOD PREPARATION SYSTEM AND RELATED METHODS", each of which is incorporated herein in its entirety for all purposes.

BACKGROUND OF THE INVENTION

1. Field of the Invention

This invention relates to kitchen appliances and more particularly to robotic kitchen appliances capable of performing a wide range of food preparation steps in a restaurant environment.

2. Description of the Related Art

Providing a robust and effective apparatus or combination of apparatuses to prepare food for consumers is challenging because of the wide variety of types of food, cooking techniques, kitchen appliances, kitchen tools, and utensils. Additionally, food preparation is often labor intensive and subject to human error. Workers employed by these businesses require careful and sometimes excessive training to accurately and safely prepare the food, thus increasing costs. It follows that businesses that prepare and sell food typically have high labor costs and experience large amounts of monetary and food loss as well as customer dissatisfaction due to human error.

Various commercial food preparation equipment addressed some of these challenges. The existing equipment, however, has several drawbacks. First, food preparation equipment is usually designed as a bespoke solution to perform a limited scope of work. Chaining together many different pieces into a workflow is a complex and expensive process and results in a system with highly limited capabilities yet a large footprint. Second, such food preparation equipment typically requires batch preparation of food items. For example, clamshell grills are typically designed to prepare multiple food items in batches and are not useful for preparing items individually. Third, the increased mechanical and/or electrical complexity inherent in such devices often leads to increased failure rates versus conventional, non-automated versions of such devices, resulting in higher downtimes. Such downtimes can be especially costly for restaurants because restaurants do not typically have back-up equipment onsite and consequently they may not be able to cook a number of items on their menu which reduces average order size or even drives away potential customers. Fourth, such food preparation equipment typically has a large footprint compared to conventional versions of the equipment and for the variety of items they are capable of cooking. This larger size is a challenge for restaurant owners because of the high cost of kitchen space. For example, the above mentioned MasterMatic fryer is substantially larger than a similar model without the automatic conveyor. Fifth, the potential benefits of such food preparation equipment are often outweighed by their associated upfront costs. For example, automated frying equipment is significantly more expensive than conventional frying equipment. Sixth, such food preparation equipment still requires extensive involvement of kitchen workers. Seventh, most food preparation equipment doesn't interact with outside data to achieve optimal production scheduling and reduce food wasted. Because of the above challenges, use of automation in restaurant and food service operations is generally limited to spot solutions and does not take advantage of the availability of data to build accurate demand models and then use these models to automatically feed a production schedule.

Additionally, there are challenges associated with raw food packaging. In order for a robotic kitchen assistant to provide maximum value to the end customer, it needs to effectively batch kitchen worker interaction time. One point where batching is needed is the input of workload to the kitchen assistant. This patent focuses on a part of a general solution to the input of raw food to a kitchen assistant by providing a modular storage container that can be easily packed by either humans or robots, unpacked by robots, and docked to robotic kitchen assistants in a safe manner.

Additionally, there are challenges associated with Food Temperature Testing. Temperature testing of cooked foods using a thermal probe is commonplace in commercial kitchens. A thermal probe is a metal rod with a pointed tip used to penetrate foods and measure internal temperature. Proper testing of internal temperature is essential for achieving a high level of food safety. In order to properly test a batch of cooked food with a manual thermal probe, a kitchen worker must separate the individual pieces of food in the batch and locate the largest pieces. The worker must then insert the thermal probe into the thickest part of the meat at an appropriate angle and to an appropriate depth to measure the temperature correctly. The goal is generally to measure the coldest piece of the cooked object to ascertain that it has exceeded a threshold to meet food safety standards. The process of temperature testing a batch of cooked food is time-consuming and prone to error. As a result of the extra work requirement, the temperature testing step of cooking is often skipped during execution of commercial food service by food service workers regardless of any standard operating procedure. Adding an automated solution to temperature testing to a commercial kitchen to automate the process of temperature testing can result in improved food safety without additional labor cost.

Additionally, there are challenges associated with Equipment Temperature Integration with the Robot. Most kitchen equipment that use heat to cook have an integrated thermal control system to set and hold the desired temperature profile. This temperature profile is not always held accurately though when a thermal disturbance, such as a batch of frozen fries, is added. Faster cooking and improved quality of product can be achieved by tracking this thermal profile more accurately.

Additionally, there are challenges associated with utensils for frying food items. Fry baskets are used to contain food during the cooking process in a fryer, enabling easy extraction from product. An alternative approach is termed "open-bay" cooking, where food is tossed in the fryer and then shoveled out. Baskets are traditionally made from wire or sheet metal with silicone handles to provide thermal insulation for a kitchen worker grabbing the basket.

Additionally, there are challenges associated with packaging and plating the cooked food items. Designing an apparatus that is robust to packing or plating a variety of foods using a variety of containers while simultaneously measuring and counting is challenging due to the wide variety of food types in many shapes and forms as well as the variety of plates and containers available. Various commercial equipment addresses some of these challenges. One example of equipment for portioning food is a scale which weighs and releases a fixed amount of food repeatedly. An example of a scale is the Depositor manufactured by Weigh-Pack Systems, Inc. (Montreal, QC).

Packing and plating food is commonly done by food service workers in commercial kitchens in order to ease distribution to end consumers. The task of packing takes several forms and involves arranging food items (and other items), sometimes in a specific pattern, within a container or on a plate. The packing task may involve sorting through several types of food items and portioning one or more types of food. Portioning means to pack or plate a specific amount of food as may be measured by weight, volume, or quantity, or some combination of these metrics. In most kitchens, measurements can be accomplished with measuring tools such as measuring cups or spoons for volume or a scale for weight. In practice, many kitchen workers choose to approximate portioning in lieu or testing. This can cause concerns for end consumers and impact profits for food service operators. Automation exists for packing systems but such systems are generally large and expensive to design and build making them impractical for a many food service operations such as restaurants and cooking commissaries. Second, these devices are often large and dedicated to a single food item, which would require multiple custom devices to package complex meals. Third, the mechanical complexity of these devices can lead to high failure rate on equipment. This downtime can be costly to restaurants or food service operators. Fourth, these automation solutions are typically set up as factory lines and are specifically tooled to packing specific items into specific packing containers. Fifth, the costs of existing systems are high since so much time must go into designing, constructing, and deploying the solution. Six, minor variations in product may require costly reconfiguration. Seven, these systems either run constantly, or require assistance from a kitchen worker instead of providing on demand packing. Eight, these systems are not easily portable.

In contrast, what is desired is a more robust system that can be moved into new location with ease and be able to sort and pack a variety of foods into a variety of containers in any desired pattern, and with limited involvement of kitchen workers.

Additionally, there are challenges associated with food distribution networks. In current food distribution networks, food is normally packaged onto pallets, shipped to stores, and then unpacked into environmental control areas, e.g., refrigerators, freezers. Individual containers of food are normally not tracked, and processes are not in place for returning unused food to central distribution warehouse.

Accordingly, a robotic kitchen system and method that overcomes the above-mentioned challenges is desirable.

SUMMARY OF THE INVENTION

A robotic kitchen system includes several modular carts with robotic arms, cameras, and computers, and can be arranged flexibly in a kitchen environment.

In embodiments, a robotic kitchen system comprises one or more robotic kitchen assistants and ancillary modular units, one or more food quantity sensors, one or more environment sensors, and a central controller to coordinate work between the robotic kitchen assistants, ancillary modular units, smart appliances, and sensors. Optionally, the system comprises one or more sensors to measure the length of the line of customers to order or pick up food. For example, a camera or sensor may be aimed at the line of customers, and the image data is input to a neural network or other AI-based system for computing the line length.

Examples of ancillary modular units include an unpacking/ingredient cart, packing unit, and storage carousel, preferably temperature-controlled carousel allowing orders to be picked up by a customer.

In embodiments, a method comprises automatically scheduling work amongst several autonomous kitchen assistant modules to obtain an optimal production plan and based on a demand model.

In embodiments, a method for building an accurate real-time demand model comprises aggregating news, weather, historical sales data, measurements of available reserves of already prepared food, and other data.

In embodiments, a method for a low-cost, safe human-robot interaction interface allows for material to pass from one to the other via a lockable drawer.

In embodiments, a method quickly unlocks a system from one location and moves it to a different location in the kitchen. The locking mechanism is made to be easily cleaned yet strong enough to support the forces of normal robot movement.

In embodiments, the modular robotic kitchen system includes a food quantity sensor system. The food quantity sensor system is operable to see in hot cases holding food and approximate the amount of food remaining using one or more imaging sensors such as RGB cameras, IR cameras, and depth cameras. In embodiments, the food quantity sensor uses a rechargeable battery and can be easily mounted on a variety of surfaces. In embodiments, the food quantity sensor houses one or more imaging sensors such as RGB cameras, IR cameras, and depth cameras. In embodiments, the food quantity sensor is operable to communicate with other components of the robotic kitchen system through Wi-Fi.

In embodiments, the modular robotic kitchen system includes one or more robotic kitchen systems each including robotic arm, a cart, and shielded workspace.

In embodiments, the Robotic Kitchen Assistants communicate through Wi-Fi or wired ethernet.

In embodiments, Robotic Kitchen Assistants are operable to coordinate with each other in a distributed fashion, without a central controller.

In embodiments, the modular robotic kitchen system includes a central computer wherein the central computer is operable to schedule actions amongst the components and systems. In embodiments, this scheduling can be accomplished with Monte Carlo Tree Search or other probabilistic methods.

In embodiments, mobile sleds or transport robots are used to transport ingredients, utensils, cooked food, or other objects between Robotic Kitchen Assistants.

In embodiments, conveyors are used to transport ingredients, utensils, cooked food, or other objects between Robotic Kitchen Assistants. In embodiments, the conveyors are conveyor networks comprising omnidirectional or multi-directional conveyors that are able to send a universal bin down any path in the conveyor network. Scheduling is accomplished with a global scheduling node that has knowledge of all operations in the modular robotic kitchen system.

In embodiments, demand is created through an ordering interface which is exposed by mobile phone application and other web-based applications.

In embodiments, the modular robotic kitchen system includes an automated kiosk, which is operable to create demand leading to production of the requested order.

In embodiments, the system is operable to commence cooking before something has been ordered based on the demand model which can reduce the wait time for customers. With enough historical demand data and incoming data, an effective model can be built to reduce wait time without significantly impacting food waste.

In embodiments, a demand model can lead to lower food waste than a traditional production plan because it has access to real-time data which generally has a larger influence on demand than historical data alone.

Raw Food Packing

In embodiments, the modular robotic kitchen system comprises ingredient cart. The cart comprises multiple storage volumes to hold stacked pouches or rigid containers of food. In embodiments, the cart further comprises a computerized thermal and humidity tracking system built into cart to monitor the food over time.

In embodiments, the cart further comprises a computer database and/or blockchain system to log the environmental data and share it for auditability by other companies and the public.

In embodiments, a freezer-safe plastic bag with implements for picking up by a robot and opening via a blade. Implements may vary widely. In embodiments, the implements are knobs for easy grasping. In embodiments the freezer-safe plastic bag comprises a perforation to remove the need for a blade. In embodiments the freezer-safe plastic bag is made from materials that degrade in hot oil such that the bag breaks down in fryer, removing the need to separate bag from food before frying.

Food Temperature Testing

In embodiments, a robotic end-of-arm tool includes a thermal probe designed for testing the internal temperature of food.

In embodiments, the thermal probe is retractable thermal probe such that it can be quickly extended to puncture and penetrate food quickly.

In embodiments, the thermal probe is spring-loaded such that the thermal probe can be retracted with an electromagnetic actuator.

In embodiments, the thermal probe comprises a force sensor to measure the force being felt on the extended thermal probe using Hooke's Law.

In embodiments, a high-speed electromagnetic actuator is used to extend and retract the probe.

In embodiments, force measurement on the probe is determined by actuator current requirements.

In embodiments, the thermal probe comprises a high-speed pneumatic actuator to extend and retract the probe.

In embodiments, force measurement on the probe is calculated using measurements from a pressure sensor.

In embodiments, a temperature testing system includes a robotic arm and one or more imaging sensors to test the internal temperature of food with a thermal probe. The system optionally includes a sanitary bath for sanitizing the thermal probe.

In embodiments, a method for singulating pieces of cooked food from a batch, ranking the pieces according to size, and testing the internal temperature of the largest pieces to guarantee food safety requirements using an array of sensors comprising cameras (optical and/or IR) and Time-of-Flight sensors (depth measurements) pointed at a food preparation area and a thermal probe comprising the following steps: inspecting the food preparation area using cameras to obtain image data; classifying food items and estimating the volume of food items using cameras pointed at a food preparation area; determining the position and orientation of food items in the food preparation area based on image data from the sensors; inserting a thermal probe into the food items; measuring the internal temperature of the food items.

In embodiments, a tool comprising a thermal probe, a flange, and, in implementations, an actuator, hereafter called a Temperature Testing Tool, is used to take accurate temperature measurements of the internal temperature of food rapidly.

In embodiments, a system comprising an arm, a cart, a vibrating table, several imaging sensors, and a thermal probe may assist in the performance of these steps.

In embodiments, the thermal probe may be a proper Temperature Testing Tool with actuation or it may just be a simple thermal probe.

In embodiments, the food items are separated from one another by placing them on a vibrating surface.

In embodiments, the food items are not separated from one other and are measured in a bin. In embodiments, they are measured directly in the basket that they are fried in.

In embodiments, the internal temperature measurement is performed without the use of a probe and instead uses a measurement of surface temperature.

In embodiments, the food items are separated by passing them through a chute and measurements are taken to determine the volume and proper point for temperature measurement as the food items pass through the chute.

In embodiments, the food items are placed in a bin prior to measurement. In embodiments, the bin is placed on a vibrating rack.

In embodiments, the bin may be made of a transparent material in all necessary wavelengths to allow under-mounted cameras to provide additional information on top of information provided by over-mounted cameras.

In embodiments, a vibrating tray is sometimes used instead of a Bin and Vibrating Rack.

In embodiments, the robot arm manipulates and agitates the tray to separate the food pieces from one another.

In embodiments, the robot arm manipulates the cooked food on the tray to separate pieces from one another.

In embodiments, the food items are measured by the sensors and probed in the basket that they were fried in.

In embodiments, the Temperature Testing Tool may have a spring-loaded probe that can be used to rapidly penetrate a food item without moving or deforming the item significantly.

In embodiments, the Temperature Testing Tool may use pneumatics or electromagnetic actuation to rapidly extend.

In embodiments, the Temperature Testing Tool may also have a flange surrounding the probe to allow the probe to be removed easily and to prevent food items from sticking to the probe.

In embodiments, the thermal probe has multiple thermal probes to measure temperature gradients.

In embodiments, a sanitary bath is used to sanitize the Temperature Testing Tool.

In embodiments, heat is applied to the Temperature Testing Tool to sanitize it.

In embodiments, the probe contains heaters that heat it to a temperature sufficient to sanitize it.

In embodiments, the probe includes multiple temperature sensors along its length and probes multiple food items at once.

In embodiments, the probe passes through one of more food items to reach and measure the temperature of the target food item.

In embodiments, multiple probes are used simultaneously.

In embodiments, multiple probes are attached to a wheel or track that moves the probes in such a way that temperature measurements of the food items can be taken as the food items pass through a chute that serves to separate the food items.

In embodiments, the temperature probe is contactless and uses microwave absorption to assess the extent to which the food item has been cooked.

In embodiments, multiple probes with multiple actuators are employed to probe multiple food items simultaneously. In embodiments, the multiple probes measure fried items directly in the basket that they were fried in.

In embodiments, the tool can be detached from the robot arm to allow for thorough cleaning.

In embodiments, the Temperature Testing Tool can be disassembled easily for thorough cleaning.

In embodiments, identification is accomplished with a convolutional neural network processed on one or more CPUs and/or GPUs.

In embodiments, 3D models are reconstructed from a multi-view imaging sensor array. In embodiments, volumetric measurements are estimated with geometric analysis of sensed 3D objects.

In embodiments, geometric computations are performed on one or more CPUs and/or GPUs.

In embodiments, the testing area and robot arm are partially or fully enclosed in protective barriers for safety.

In embodiments, the cart may contain a tool belt to hold a variety of tools including thermal probes and calibration tools.

In embodiments, the cart may have several fixed fiducial markers to provide constant feedback on calibration accuracy and allow instantaneous calibration.

Equipment Temperature Integration with Robot

In embodiments, the modular robotic kitchen system comprises a controller to monitor and control appliance temperatures.

In embodiments, the controller integrates with existing kitchen equipment to override the existing thermal control via a wired or wireless interface.

In embodiments, a control algorithm for kitchen equipment takes as input a future thermal load profile. In a particular embodiment, a thermal load profile for a fryer is the schedule for when a food product is dropped in fryer. The control input is decided using a combination of model predictive control for initial guess and machine learning to correct for abnormalities in model.

In embodiments, the modular robotic kitchen system includes a health monitoring module operable to track a metric such as heat transfer efficiency for purposes of health monitoring of equipment.

In embodiments, the modular robotic kitchen system includes a convolutional neural network operable to track motions around kitchen to predict future thermal loads on equipment. In a particular embodiment, the system is trained to recognize a person walking towards a freezer known to hold fries. The system triggers a spike in heat input to the fryer based on the recognized motion.

Novel Fry Basket

In embodiments, a fryer basket comprises a trap door-style panel to enable release of food from basket without tipping basket.

In embodiments, a fryer basket has a rectangular shape with center-mounted handle to enable higher packing efficiency in a fryer by having multiple rows of baskets.

In embodiments, a fryer basket has additional sheet metal features with sharp gradients to enable easy detection and localization via machine learning and traditional classifier algorithms.

In embodiments, a fryer basket has a sloped face between 30 and 60 degrees to enable dumping of food without tipping basket upside down.

In embodiments, a fryer basket has an inverted hanger hook on the front of basket to enable dumping of basket without lifting full weight of basket by engaging a fixed bar mounted on a work surface.

In embodiments, the fry basket has a feature on its front end which is adapted to engage with a fixture on a workspace as a pivot. This enables the basket to be dumped without lifting the entire weight of the basket. In embodiments, the feature is an inverted hook, and the fixture is a horizontal bar in the workspace.

In embodiments, a fryer basket has a feature in the basket by which a piece of food is skewered at its thickest part to give a reference point for robotic system to insert temperature probe.

Robotic Food Packing System

In embodiments, a method for sorting, packing, and plating food using an array of sensors comprising cameras (optical and/or IR) and Time-of-Flight sensors (depth measurements) pointed at a food preparation area; inspecting the food preparation area using cameras to obtain image data; classifying food items and estimating the volume of food items using cameras pointed at a food preparation area; determining the position and orientation of food items in the food preparation area based on image data from the sensors.

In embodiments, a system comprising a cart, a robotic arm, one or more imaging sensors, and a combination of CPUs and GPUs.

In embodiments, the step of aiming a combination of sensors comprising infrared camera, RGB camera, and depth sensor at the food preparation area.

In embodiments, the step of aiming the combination of sensors is performed as a part of the setup of the system and the system can perform the inspecting and determining steps multiple times without additional aiming steps.

In embodiments, the step of determining identity, position, and orientation of objects is performed using a trained neural network.

In embodiments, the method further comprises determining an output to command a robotic arm or other equipment from sensor inputs, instruct a kitchen worker through speech, via electronic message such as SMS or e-mail, and visually through lights and/or gestures, or otherwise assist in food packing.

In embodiments, the food preparation item is an item selected from the group consisting of kitchen implement, and a kitchen worker or appendage of the kitchen worker.

In embodiments, processing done on one or more CPUs and/or GPUs determines the identity, position, and orientation of at least one food item or food preparation item.

In embodiments, appropriate actions are selected as a result of processing done on one or more CPUs and/or GPUs.

In embodiments, a cart with a robotic arm and several cameras, along with one or more gripping, scooping, or suction tools is commanded by the method based on computations.

In embodiments, a neural network is used to command the arm to sort through several food types and portion out one or more food types.

In embodiments, measurements of volume can be made by geometric estimation from stereographic image measurements.

In embodiments, the system has a scale or force sensing on the robot to measure weight of food items. This measurement is assisted using the arm as part of the method of sorting and packing food items based on sensor inputs.

In embodiments, quantity of food items is measured by counting objects identified by convolutional neural networks.

In embodiments, input data from sensors is processed to validate the presence of packing containers.

In embodiments, packing containers can be singulated from a stack using a special gripping tool.

In embodiments, the system has a tool changer to allow it to change between various gripping and suctioning tools as well as other tools. In embodiments, a method comprises the steps of sorting, portioning, and packing food objects using a robotic arm. The method further comprises controlling the motion of the robotic arm based on sensor input from optical and/or infrared cameras. In embodiments, a local computer is operable to carry out the step of determining and controlling the motion of the robotic arm.

In embodiments, the sensor information is used to determine the position and orientation of food items.

In embodiments, the sensor information is used to determine the number of food items present.

In embodiments, the sensor information is used to estimate the volume of food items.

In embodiments, the method includes identifying various food items and containers using a trained convolutional neural network. In embodiments, the output is an output layer from the convolutional neural network.

In embodiments, the method provides location information, and the location information is a pixel mask or a bounding box of one or more images.

In embodiments, the method further comprises using the information to command the robotic arm.

In embodiments, a system further comprises an end-of-arm robotic tool that can be used to portion liquids and powders.

Food Distribution Network

In embodiments, a method for determining optimal routing of food product to satellite kitchen locations for final preparation, and a return system for minimizing food waste when anomalies in prior food distribution occurs includes the steps of packaging, cooking, and routing the food items such that a response time of food borne illness outbreaks is improved. In embodiments, ingredients are redistributed between local kitchens. In a preferred embodiment, a mobile packaging unit and a mobile ingredient unit are provided for holding frozen food. A robotic arm is operable to transfer the frozen food between the packaging and storage unit.

In embodiments, the food distribution network comprises a consistent container object for all food items.

In embodiments, an optimal routing is determined based on reinforcement learning on simulated and prior data. In embodiments, the optimal routing is initially specified by a human, and then an optimal routing is determined. Re-routing is computed by the network and used to correct for inefficiencies.

In embodiments, improperly managed food is automatically flagged and this information is replicated and understood by all nodes within network within a small amount of time via either a database or a blockchain. The food is quickly removed from circulation and discarded, preserving food safety.

In embodiments, a central or remote or cloud storage maintains a blockchain of food safety data by related, relevant or competing companies, and either the full blockchain or a redacted or hashed version of the data is shared with the public, serving amongst other things, for public auditability.

The description, objects and advantages of embodiments of the present invention will become apparent from the detailed description to follow, together with the accompanying drawings.

BRIEF DESCRIPTION OF THE DRAWINGS

FIGS. 15A and 15B are a side and front views, respectively, of a robotic food packing system in accordance with an embodiment of the invention;

FIG. 18A shows a basket design with computer vision (CV) marker mount plate and diamond in accordance with an embodiment of the invention;

FIG. 18B shows a basket design with T-shaped feature on top of basket to add more vertices to object with sharp edges in accordance with an embodiment of the invention;

FIG. 19 shows a basket design with implement for easy dumping of basket without lifting full weight of basket in accordance with an embodiment of the invention;

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein is a modular robotic kitchen system.

Overview

Figure 1:
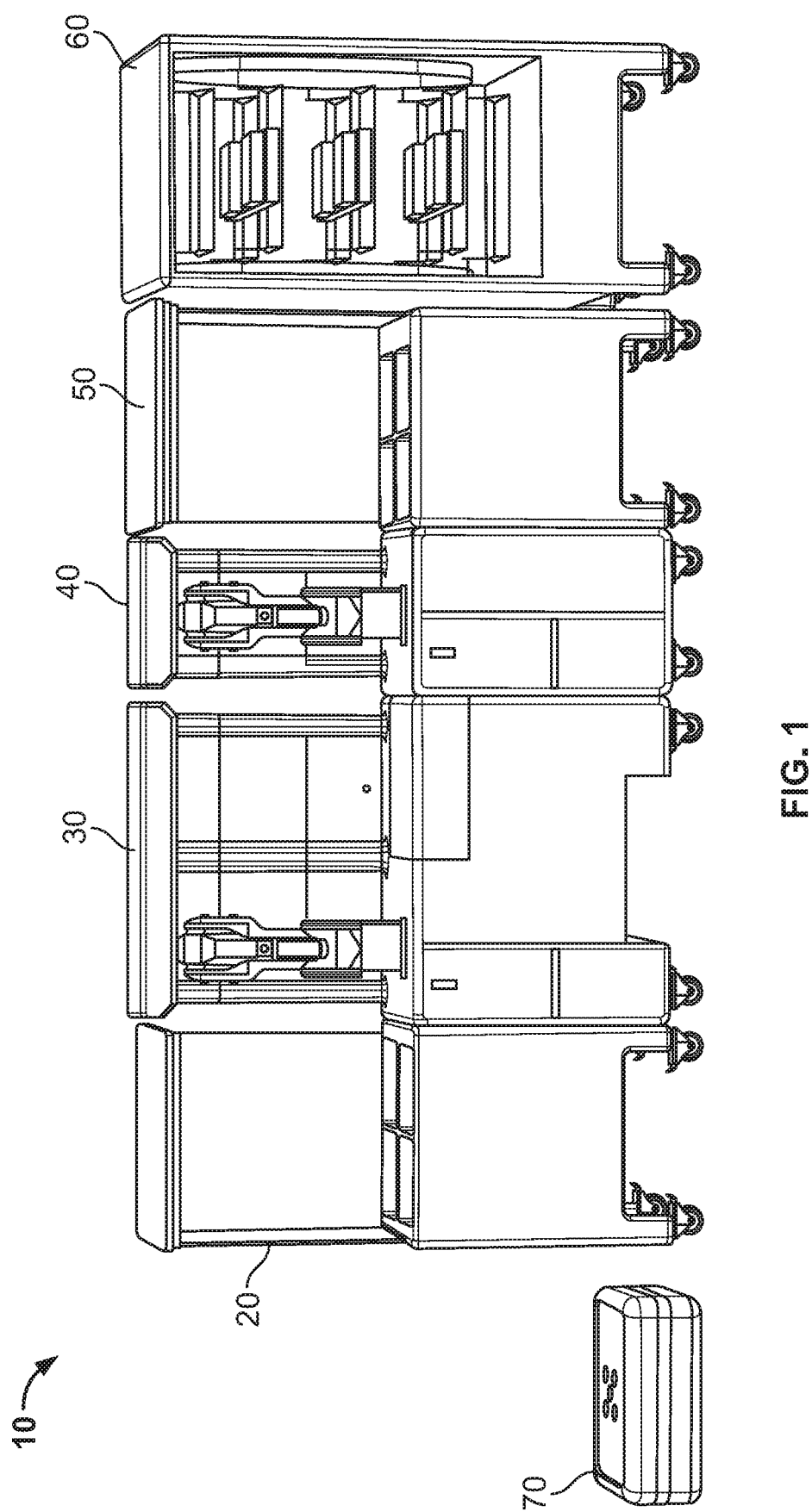
FIG. 1 is a modular robotic kitchen system comprising a plurality of modular carts in accordance with an embodiment of the invention.

FIG. 1 shows a cooking system 10 in accordance with an embodiment of the present invention. The cooking system 10 shows a plurality of modular units including an unpacking or ingredient unit 20, robotic kitchen assistant unit 30, robotic extension unit 40, packing unit 50, and warming or pick-up unit 60, each of which is discussed herein. Each of the modular units are shown including a shielded workspace, a cart, and wheels to facilitate locating and relocating each of the carts.

Also shown in FIG. 1 is an optional transport robot 70 to assist moving the modular units and to transport food and supplies between the modular units. See also mobile transport 910 in FIG. 20 positioning a modular cart 920 adjacent a main robotic arm module 930. An exemplary sled for use in the subject invention is described in U.S. patent application Ser. No. 16/281,088, filed Feb. 20, 2019, and entitled "ROBOTIC SLED-ENHANCED FOOD PREPARATION SYSTEM AND RELATED METHODS."

RKA Module/Unit

The robotic kitchen assistant (RKA) module 30 is shown including a shielded workspace, counter-top or bin area, a robotic arm having a plurality of degrees of freedom (preferably, 6 DOF), at least one sensor or camera, and a computer operable to control the motion of the robotic arm to carry out food preparation steps as discussed further herein. Examples of an RKA and robotic arm suitable are described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS" and US Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS."

Unpacking/Ingredient Module

The unpacking or ingredient cart 20 is shown including a shielded workspace, and four separate areas for holding ingredients or bins of ingredients. As discussed further herein, in embodiments, the ingredient cart 20 can hold multiple food items (up to 10), is robot friendly; includes face protection, and a lid or cover to close. Optionally, one or more of the separate areas are refrigerated. Additionally, in embodiments, discussed further herein, the system employs raw food packaging facilitating robot actions.

Cooking Appliances

Figure 2:
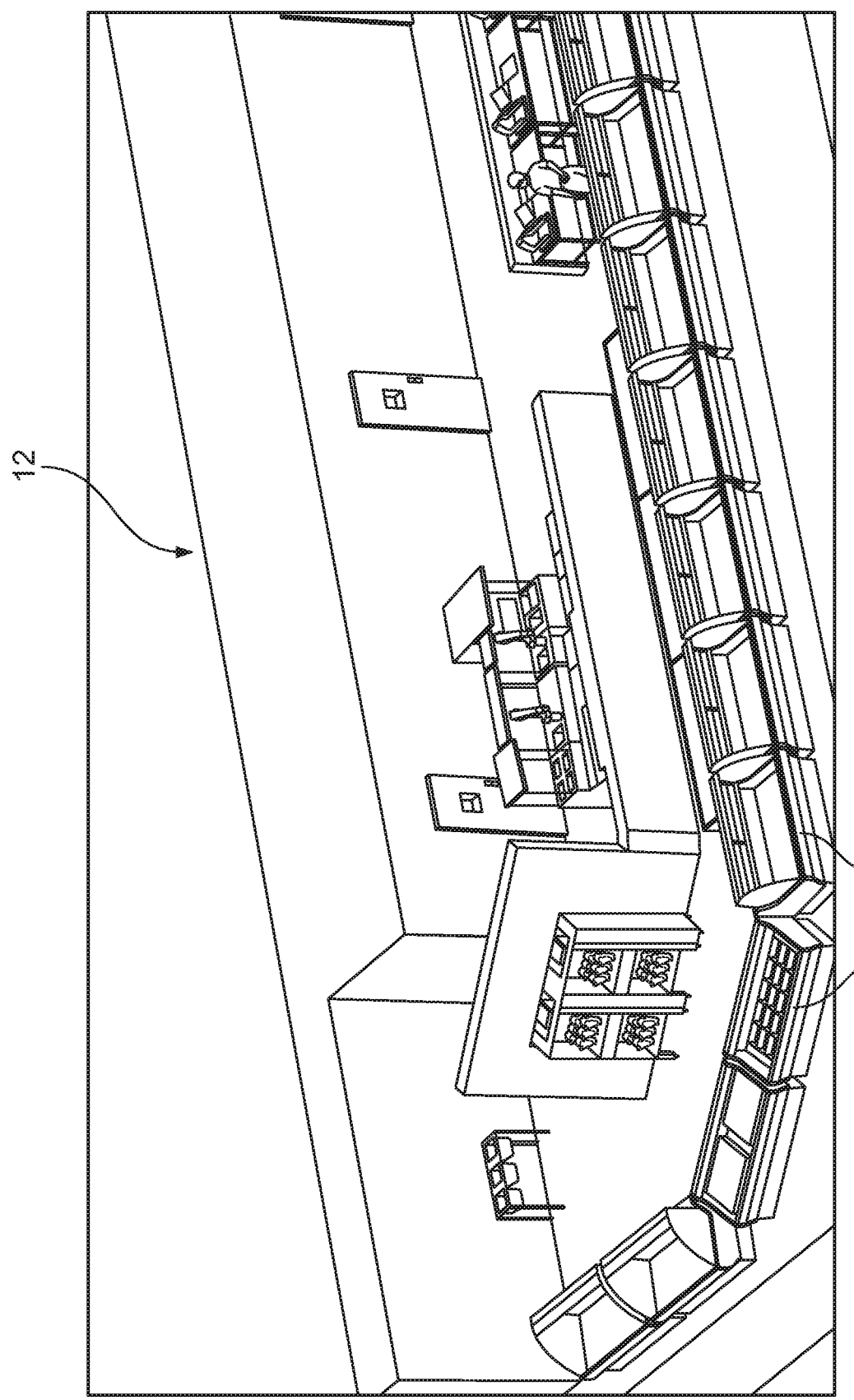
FIGS. 2-4 show various views of another modular robotic kitchen system arranged in a commercial kitchen environment in accordance with an embodiment of the invention.
Figure 3:
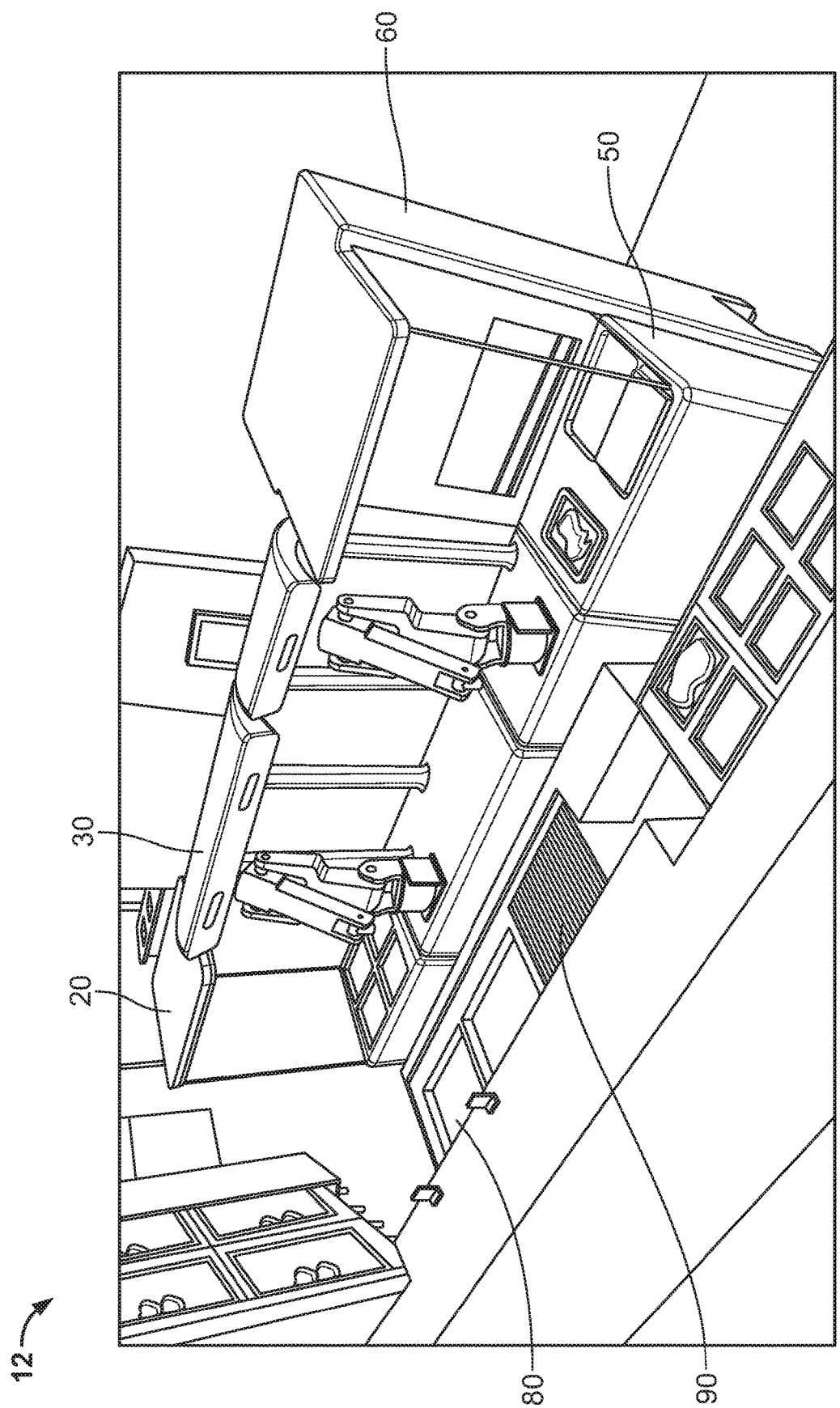
Figure 4:
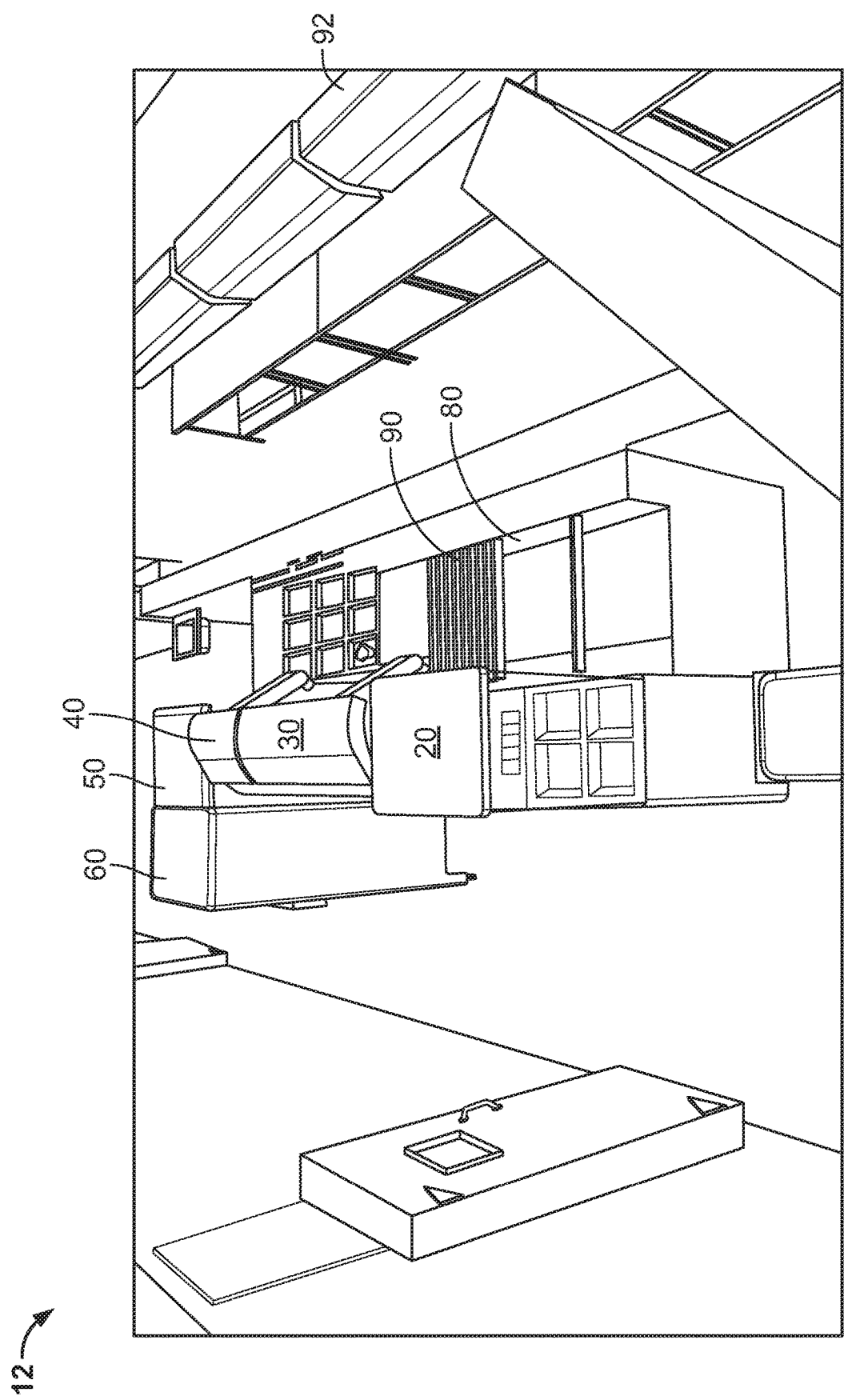

The modular robotic kitchen system can operate with a wide range of cooking appliances (e.g. fryer 80, grill 90) as shown in FIGS. 2-4, and as discussed further herein. The robotic arm(s) are operable to move food items to and from the applications to cook.

Preferably, in embodiments, temperature of the food items being cooked is monitored. The temperature m/x can be input to scheduler engine, described further herein. Additionally, in embodiments, the temperature in the appliances (e.g., fryer oil, oven temperature, grill surface, etc.) can be monitored and automatically controlled, discussed further herein.

Additionally, in embodiments, the modular robotic kitchen system can include various utensils to facilitate transferring from one station or cart to another. In a particular embodiment, a fry basket is operable with the fryer and enables convenient and safe transfer of the fried items to another unit or workspace, discussed further herein.

Assembly & Packing Module

FIGS. 1-4 show an assembly and packing module 50. The packing module unit 50 is shown having a shielded workspace, counter and/or bins for supporting plates, dishes, bowls, or packing on which to serve or ship the completed entree. Packing may be carried out in various manners, discussed further herein.

Warming Module

FIGS. 1-4 show a warming module 60 for holding completed entrees. The warming module shown in FIG. 1 includes an enclosed space, temperature controlled, shelves optionally automatically movable to receive and present a completed entrée, and includes sensors to monitor temperature and confirm contents and inventor therein. Completed entrees may also be transported to the hot or cold cases 92, 94.

Extension Module

FIGS. 1-4 show an RKA extension module 40 to enhance, amongst other things, the reach, speed, and capability of the kitchen system. The RKA extension module is shown having a shielded workspace, small counter-top relative to the RKA cart 30, a robotic arm having a plurality of degrees of freedom (preferably, 6 DOF), at least one sensor or camera, and optionally a sub-servant computer operable to control the motion of the robotic arm. Optionally, a main computer controls the motion of both the main RKA cart and the extension module. Examples of an RKA and robotic arm suitable for the extension cart 40 are described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS" and US Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS."

System Architecture

Figure 5:
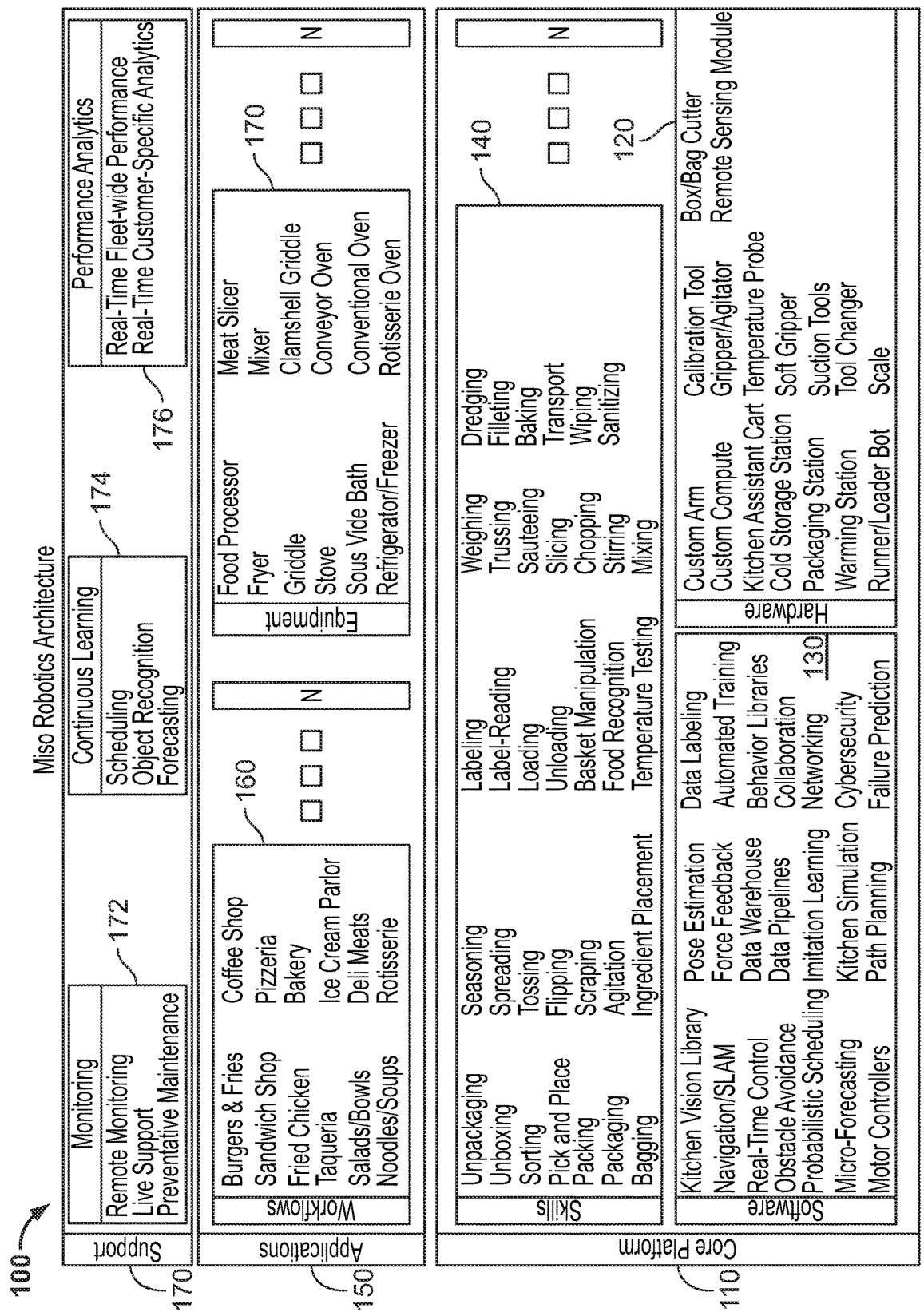
FIG. 5 is an illustration of a flexible system architecture of a robotic kitchen system, and optionally a modular robotic kitchen, in accordance with embodiments of the invention.

FIG. 5 is block diagram illustrating the system architecture 100 of a robotic kitchen system in accordance with an embodiment of the invention. With reference to FIG. 5, a core platform 110 includes hardware 120 and software 130.

Examples for use with embodiments of the inventions of hardware and software include, without limitation, central computer, servers, processors, memory and storage, commination interface, sensors, cameras, input devices such as keyboards or touchscreen displays, display. The processor is programmed or operable to execute various applications described herein as well as enable modules or engines for determining location and identification of food items, doneness, scheduling of steps, demand of food items, and inventory. Examples of food identification and location, scheduling, and demand modules as descried in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS", U.S. patent application Ser. No. 16/490,775, filed Sep. 3, 2019, entitled "AUGMENTED REALITY-ENHANCED FOOD PREPARATION SYSTEM AND RELATED METHODS", and US Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", each of which is incorporated by reference in its entirety for all purposes.

Core platform additionally shows skills 140 that are enabled by the hardware and software. Collectively, the core platform is highly flexible and adaptable to perform a wide range of cooking applications 150 which may include specific cooking workflows 160 and use of specific cooking equipment 170 such as a burger workflow and use of a griddle, respectively. The core platform 110, as described further herein, is readily adaptable to run a specific cooking workflow and use the provided equipment without needing to be reworked or rewired.

In embodiments, a new cooking workflow software is downloaded to the central computer for execution. Optionally, trained models may be downloaded to the central computer or the system trains itself based on machine learning algorithms.

FIG. 5 also shows a support layer 170 including monitoring 172, continuous learning 174 and performance analytics 176.

The monitoring system 172 is operable to continuously track the status of the system and flags anomalous behavior to be corrected by local or remote staff.

The continuous learning system 174 is operable to utilize these flagged issues to retrain the neural networks in order to improve the performance of the autonomous system for food classification.

A performance analytic system 176 is operable to aggregate at regular intervals to improve store management and give guidance on where to focus efforts. The analytics serve to determine the difference between the amount food cooked compared to the amount of food ordered, to produce food safety and quality reports, and to report on the status of the machine and when the next maintenance cycle is due.

Unpacking & Raw Food Packaging

In embodiments, a method for packing, transporting, and unpacking raw food for preparation in kitchens includes providing custom containers designed for ergonomic access by humans and manipulation by mechanized systems.

Preferably, the raw packing system is in a centrally located distribution warehouse and is operable to quickly unpack and repack the modular carts. Additionally, the contents in each cart is tracked throughout the time the contents are in the cart using an automated tracking system.

The raw packing system can include various hardware such as a battery and power management system, a charging interface to supply power to the battery and power management system in the cart, and a wired and/or wireless communication system to maintain in-transit tracking of the cart and also to communicate with the robotic kitchen assistant modular unit, described herein.

In embodiments, an access control system is provided with the cart and operable to obtain a return merchandise authorization (RMA) and to allow the contents in the cart to be returned safely back to the distribution warehouse and repacked for a different store, without risking store-to-store contamination.

The packing and unpacking system can optionally log environmental data of the cart at all times.

The packing and unpacking system may include an environmental control system to control the temperature and other environmental conditions within the warehouse or kitchen. For example, in embodiments, the environmental control system comprises a compressor-based bidirectional heat pump, and optionally the heat pump may be a solid state heat pump using, e.g., Peltier junctions.

In embodiments, the environmental control system comprises a passive thermal reservoir utilizing ice or other similar latent heat of phase change and heavy insulation. In embodiments, a combination of the above thermal control systems are used in combination.

In embodiments, the raw food is packaged in a thermal insulative container. In particular embodiments, raw food is packaged in pillow packs that are hermetically sealed via plastic welding. The pillow pack is opened via a blade or a perforation in the packaging material, and the contents can then be dumped into cooking container, e.g. fryer basket or pot. The packaging material is then discarded.

In embodiments, the pillow pack container implementation can be grabbed with a suction cup.

In embodiments, the pillow pack container can be grabbed with a molded gripping feature designed for a custom end effector to enhance manipulability of pillow pack.

In embodiments, small reusable rigid containers are used to contain food product. Preferably, in embodiments, a freezer safe package can be opened without the use of a knife by pulling apart the bag.

Figure 11:
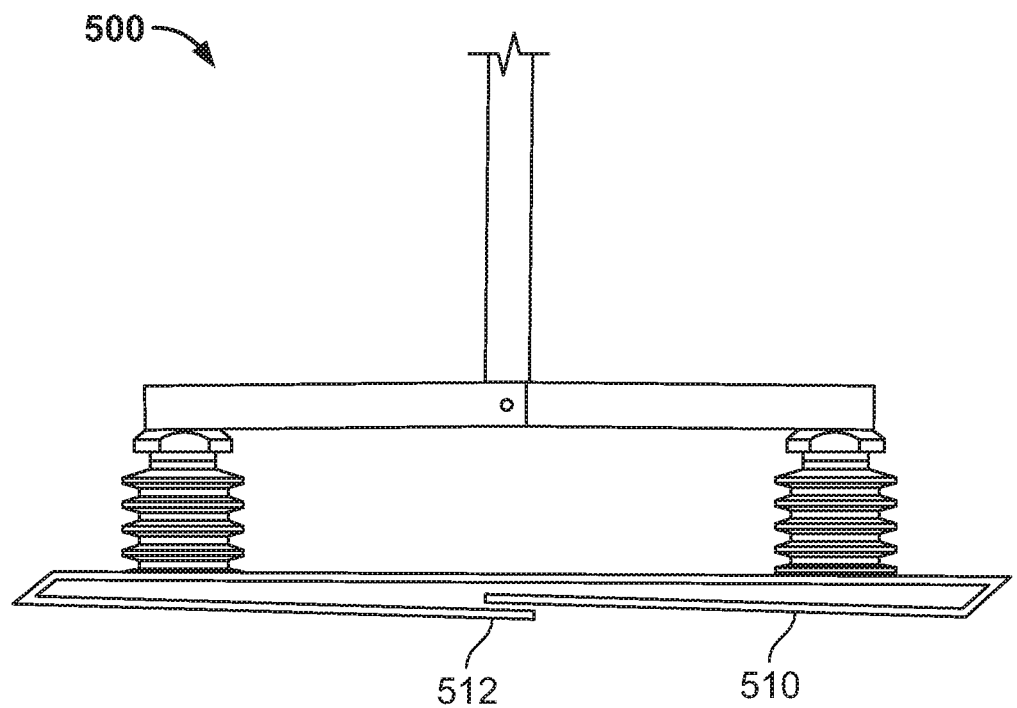
FIG. 11 shows a design of a robot-friendly freezer package with overlapping seams and gripper system in accordance with an embodiment of the present invention.
Figure 12:
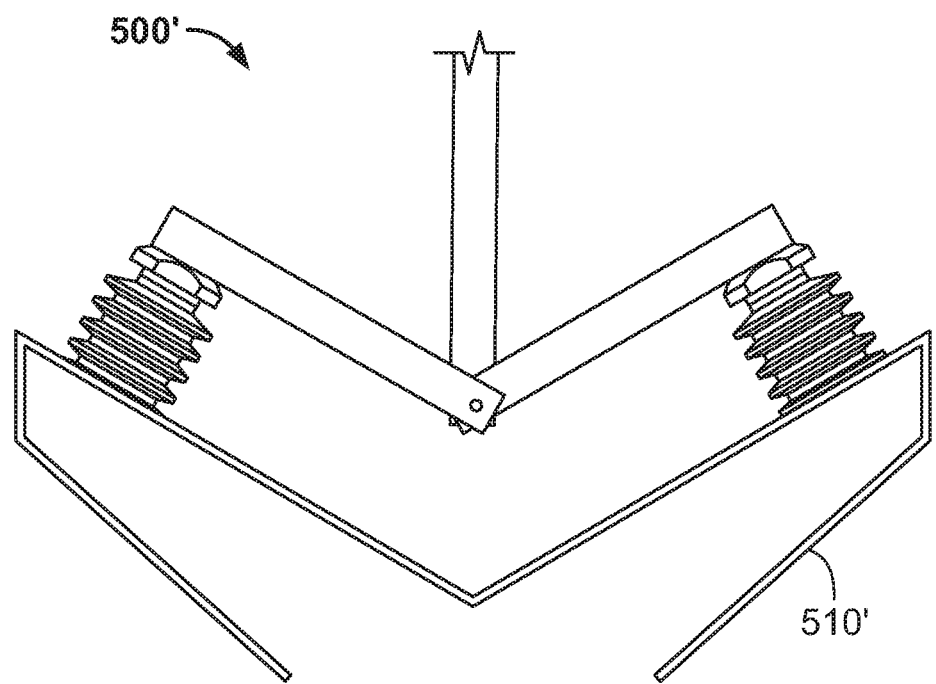
FIG. 12 shows a design of a robot-friendly freezer package opened by gripper system in accordance with an embodiment of the present invention.

With reference to FIGS. 11-12, in embodiments, a freezer-safe package 510, 510' that can be easily opened by a mechanized system 500, 500' by folding the packaging in half. FIG. 11 shows the design of a robot-friendly freezer package 510 with overlapping seams 512 and gripper system 500 in accordance with an embodiment of the present invention. FIG. 12 shows the design of the robot-friendly freezer package 510' opened by gripper system 500' in accordance with an embodiment of the present invention.

In embodiments, the freezer safe package encodes information about the product.

In embodiments, a freezer safe package is adapted to dissolve in hot oil to release contents into the oil to cook. Exemplary materials for the freezer safe bag include rice paper, starch, etc.

Temperature Testing

In embodiments, a robotic assisted method for determining the temperature of food being cooked (e.g., batch of fried foods) comprises singulating the pieces of cooked food from a batch, ranking the pieces according to size, and testing the internal temperature of the largest pieces to guarantee food safety requirements.

Figure 6:
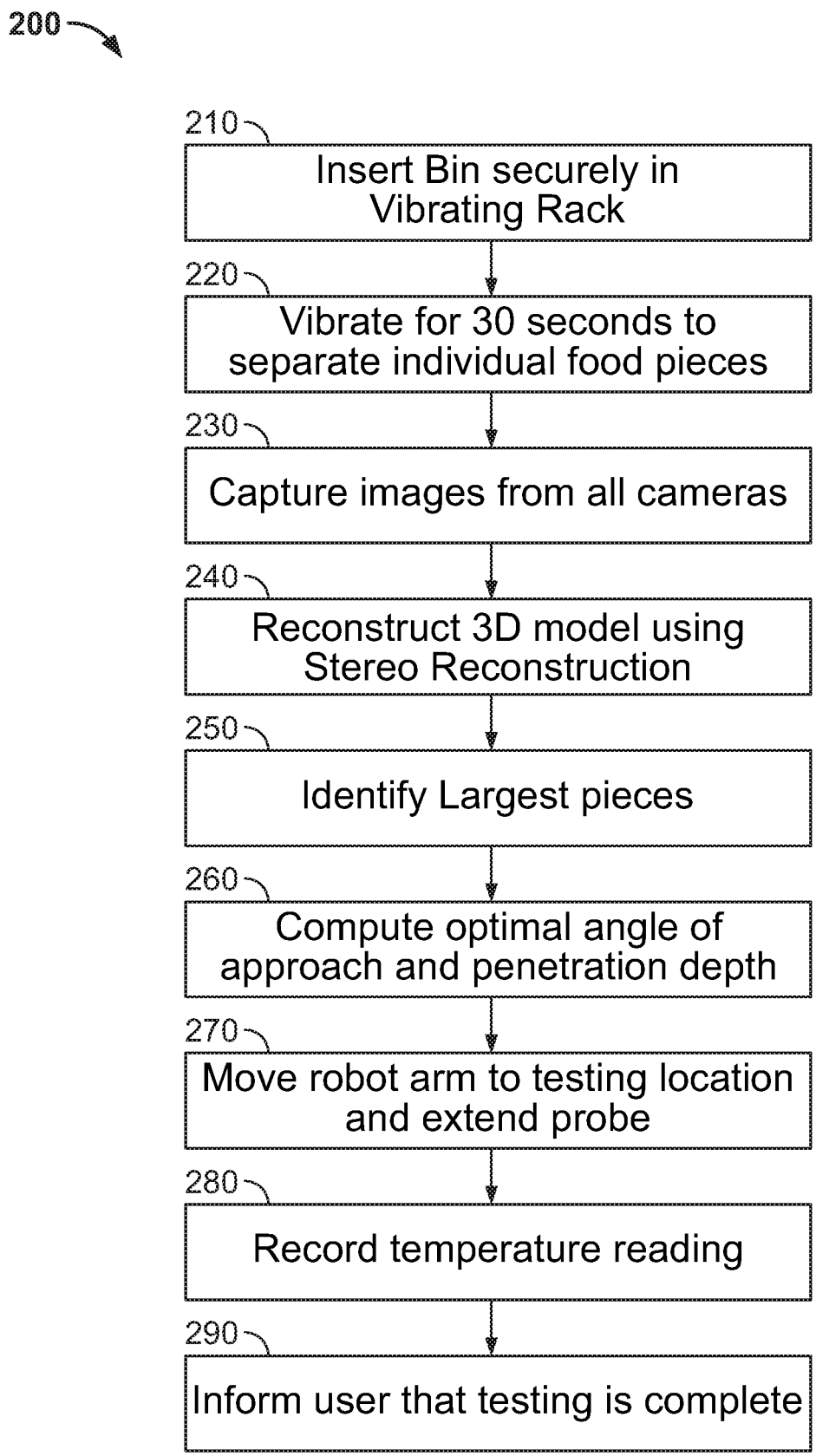
FIG. 6 is a flow diagram for a robotic temperature testing system in accordance with an embodiment of the invention.

FIG. 6 is a flowchart of a method 200 in accordance with an embodiment of the invention to test temperature of food items during cooking.

Figure 7B:
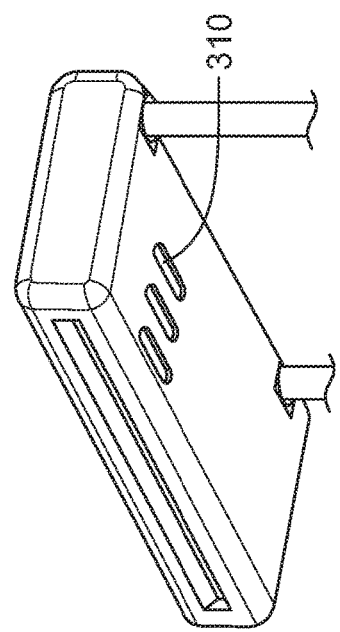
FIGS. 7A-7C show an example configuration of camera positions and orientations for a robotic temperature testing system in accordance with an embodiment of the invention.
Figure 7C:
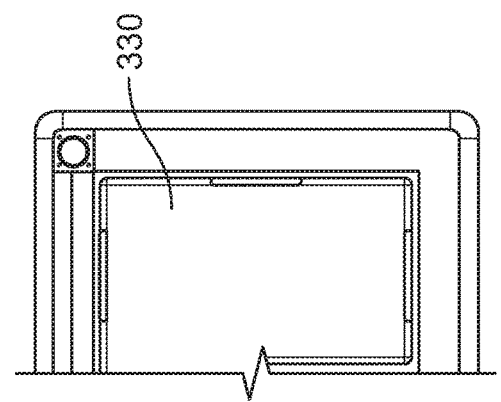
Figure 7A:
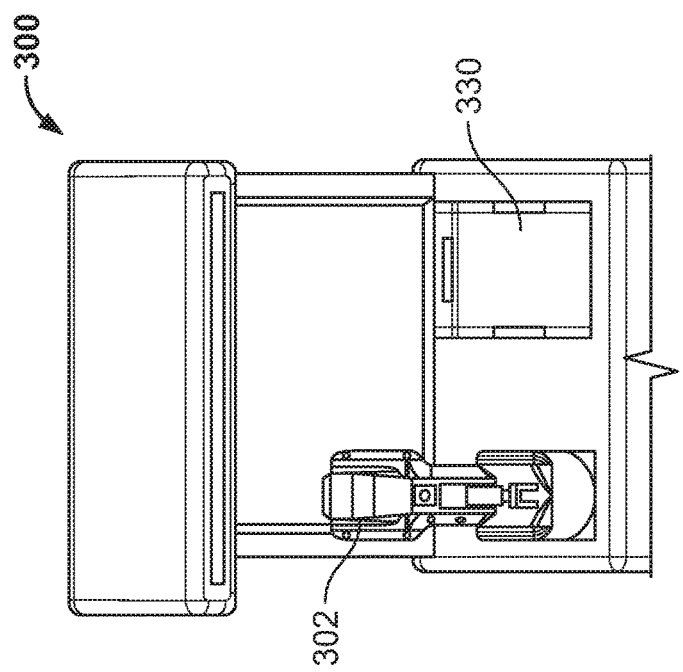

Step 210 states to insert a bin of the food items in a vibrating rack. With reference to FIGS. 7A-7C, a cart including a bin 330 is shown. The bin 330 may be placed in the rack using the robotic arm 302.

Figure 8:
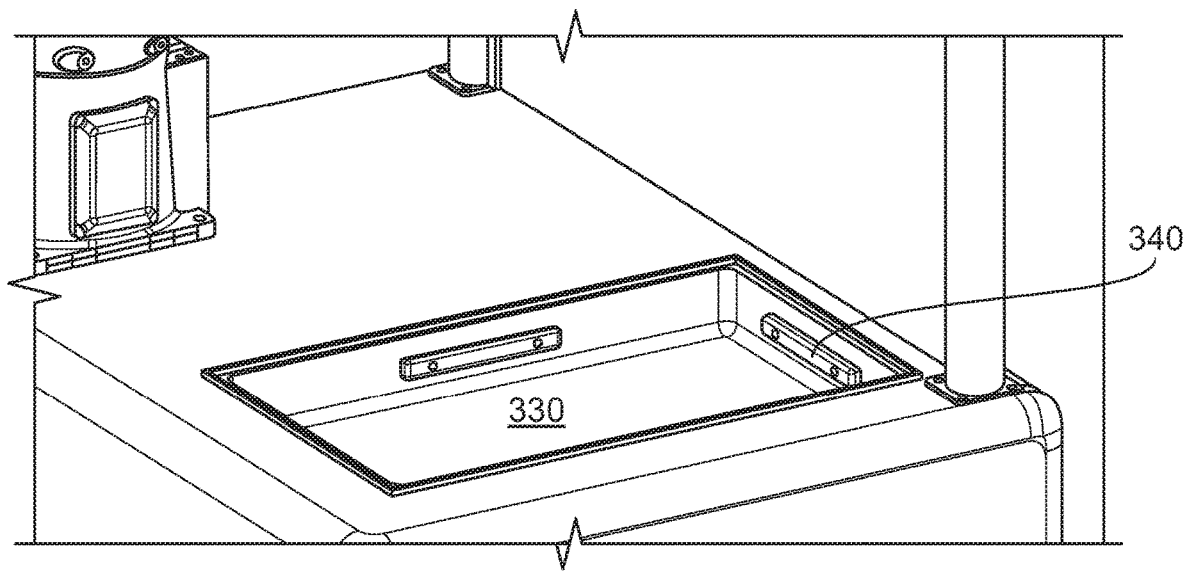
FIG. 8 shows a vibrating rack mechanism which allows a bin to be agitated easily in accordance with an embodiment of the present invention.
Figure 9:
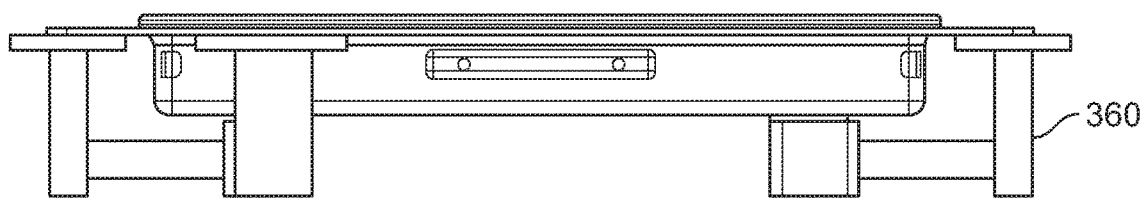
FIG. 9 shows a bin resting securely in the vibrating rack shown in FIG. 8 in accordance with an embodiment of the present invention.

An example of a vibrating rack mechanism which allows a bin to be agitated easily is shown in FIGS. 8-9. Particularly, FIG. 9 shows the Bin 330 positioned securely in the vibrating rack 360. The vibrating rack 360 is designed to hold a bin and agitate it. This causes ingredients to spread out on the bottom of the bin, thereby singulating individual pieces. Preferably the system has a vibrating rack which can hold a standard size bin. A standard size bin ranges from 3 inches by 6 inches to 12 inches by 20 inches.

The bin shown in FIG. 8 also includes a camera 340, serving to see/visualize the contents within the bin, discussed further herein.

Step 220 states to vibrate for 30 seconds, or until the foods items are separated from one another. Steps 210 and 220 collectively serve to singulate the food items.

Step 230 states to capture images of the food items from a plurality of cameras. FIGS. 7A-7C show an example configuration of camera positions and orientations 310. Additionally, in embodiments, the robot arm has a camera on its wrist, or another portion of the robot arm. The data from this robot arm-carried camera can be combined with the data from other cameras to improve accuracy by filling in sensing gaps.

Examples of the sensors include, without limitation, cameras (optical and/or IR) and Time-of-Flight sensors (depth measurements). The array of cameras 310 serves to provide enough information to estimate volume from reconstructed 3D models, discussed further herein. Additionally, the bin can be made of highly transparent material to allow vision from the bottom.

Step 240 states to reconstruct the 3D model of the food items. The robotic temperature testing system performs this analysis using the array of cameras and performing a technique called stereo reconstruction as described in, for example, Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, Volume 115, Issue 5, 2011, Pages 620-634. In embodiments, the images from the plurality of cameras are fused together using Stereo Reconstruction to obtain a 3D scan of the bins and the objects therein.

In embodiments, segmentation is achieved using a neural network as in Kaiming He, Georgia Gkioxari, Piotr Dollár, and Ross B. Girshick, Mask R-CNN, arXiv, 2017. Analyzing the segmentation can determine whether the food items have been fully singulated as well as provide a list of objects of interest.

Step 250 states to identify the largest pieces. In embodiments, for each piece of food, the system performs a volumetric analysis. Particularly, the segmented pieces are analyzed to see which are the largest with select geometric calculations to find the largest part of a piece of food. The pieces can be ranked according thickness of the thickest part. One or more of the thickest pieces are then selected for temperature testing, discussed below.

Step 260 states to compute the optimal angle of approach and penetration depth for the temperature probe discussed further herein. This approach and penetration step is calculated based on the information, size and orientation determined from the above steps. In embodiments, it is desirable to aim towards the center of mass of the food item, and of the largest food item.

In order to test a given piece of food properly, an appropriate angle of approach and penetration depth must be selected. For homogeneous items (such as a piece of boneless chicken breast), it is sufficient to locate the largest cross-sectional area and penetrate orthogonally to the surface and up to the middle of the food item.

For items that do not have reasonably homogeneous heat capacity, such as a bone-in chicken breast, it is not sufficient to simple insert into the largest cross section area. For the example of bone-in chicken breast, it's important to these the thickest piece but avoid the bone since it heats much faster than the surrounding tissue. Therefore, a model is necessary to infer optimal angle of approach and penetration depth.

Learning a model for angle of approach and penetration depth can be accomplished either through heuristic approaches or using machine learning. With either approach, the goal is to build a model to estimate the pose and parameters of a food item. Using this model, some embodiments use heuristics to specify how to approach and penetrate.

In embodiments, a heuristic model is sometimes used, such as located the largest cross-sectional area and penetrating orthogonal to that. This type of method can work well on a variety of food items. But some food items require more complicated techniques.

Other embodiments use learning by demonstration to build a model for angle of approach and penetration. In embodiments, a thermal probe that publishes its pose in space is used by a human trainer. The human trainer goes through the motions and the pose of the thermal probe is tracked over time as the human trainer tests many pieces of a type of food item. Using these data, a model can be trained that will allow computation of the optimal angle of approach and penetration depth.

These models for computing optimal angle of approach and penetration depth are generated using shared data via the Internet. This allows multiple robotic temperature testing systems to learn more quickly.

Step 270 states to move and insert the probe. In embodiments, temperature testing is performed with a temperature testing tool 400 and probe 420 attached to the end of a robot arm 302. This robot arm 302 can have 4, 5, 6, 7, or a higher number of degrees of freedom. The robot arm can also take other configurations including but not limited to that of a SCARA arm or a delta arm.

Figure 10A:
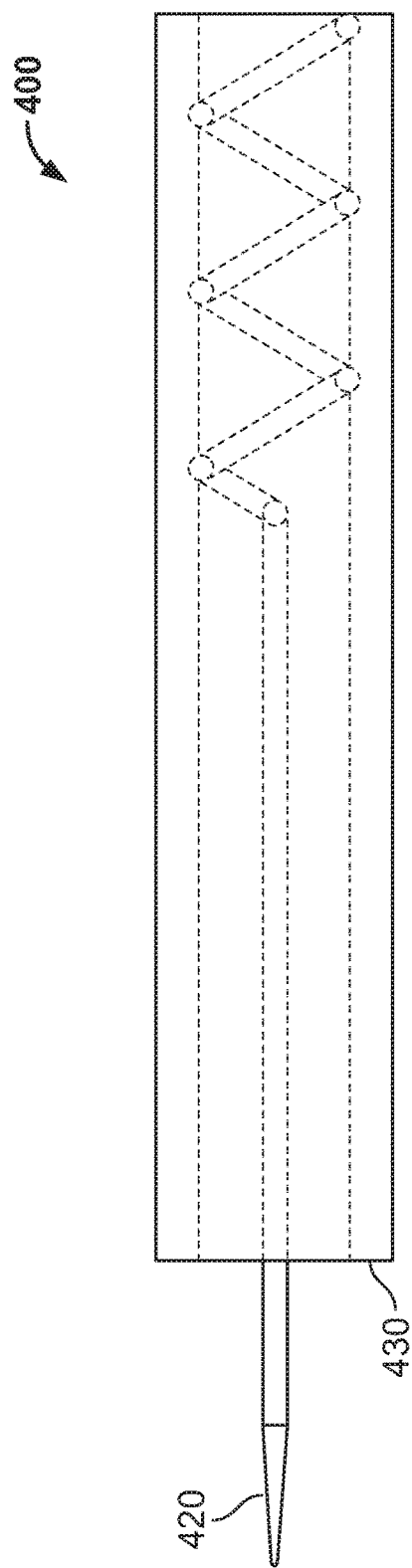
FIG. 10A shows a side view of the Temperature Testing Tool in the extended position in accordance with an embodiment of the present invention.
Figure 10B:
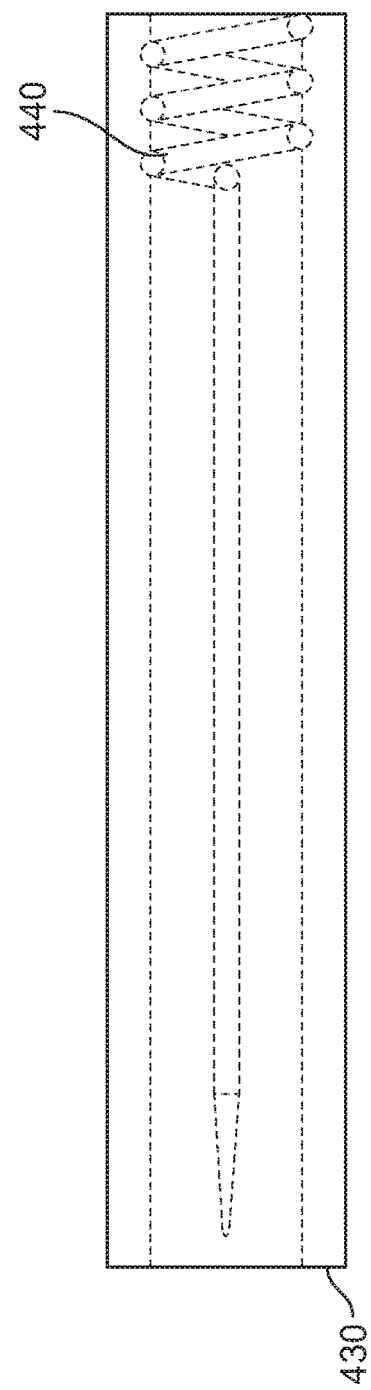
FIG. 10B shows a side view of the temperature testing tool of FIG. 10A in the retracted position.

In the embodiment shown in FIGS. 10A, 10B, a thermal probe 420 on the temperature testing tool 400 can be retracted and extended.

FIG. 10A a side view of the temperature testing tool 400 in the extended position in accordance with an embodiment of the present invention is shown. It can be seen that the probe tip 410 extends beyond the flange 420 to allow for insertion into food items.

FIG. 10B shows the temperature testing tool of FIG. 10A in the retracted position. It can be seen that the probe tip retracts beyond the flange 430 to create separation from food items. The flange 430 makes contact with the food to allow the probe to be retracted easily. The flange facilitates separating the tested food item from the probe.

The extension may be performed by various mechanisms such as, e.g., a loaded spring 440, a pneumatic actuator, or an electromagnetic actuator such as a motor. Retraction can be accomplished with a pneumatic actuator or an electromagnetic actuator. Preferably, the extension action is performed using a sufficiently fast actuator to cause the extending probe to quickly penetrate food. By moving quickly enough, the probe is able to avoid static friction altogether and operate with kinetic friction which allows for less friction overall. This mitigates undesired motion of the food item being tested that would otherwise occur during insertion of the thermal probe The probe may be made of various materials including, e.g., stainless steel or another food-safe material with appropriate thermal properties that can be inserted into a variety of cooked foods including but not limited to bone-in chicken, chicken tenders, and chicken nuggets, hen/turkey parts, boneless chicken/turkey pieces, steaks, hamburgers, fillets, tenders, cutlets, potato wedges, etc.

In embodiments, the thermal probe has axial force sensing. This force sensing provides feedback if the probe makes contact with a bone in a piece of meat or if a probe makes contact with any other impenetrable components in a piece of food. In spring-loaded embodiments of the thermal probe, the force can be sensed by measuring the displacement of the probe from full extensions and applying Hooke's Law. In electromagnetic embodiments, current and dynamics can be measured and compared against a model of expected current.

Step 280 states to record the temperature reading.

Step 290 states to inform user testing is complete.

Additionally, in embodiments of the invention, a sanitation is performed when a piece of food is measured to be below the food-safe temperature threshold. The sanitation step may be performed variously. In one embodiment, the probe is sanitized with an attached sanitation bath. The sanitation bath uses approved chemicals to sanitize the thermal probe and flange.

Equipment Temperature Integration with Robotic System

The modular kitchen systems described herein may also monitor and control temperature of the appliances (e.g., a fryer or oven) during operation.

In one embodiment, a method for controlling kitchen equipment temperature includes selecting the optimal input at present time while optimizing for a time horizon based off of future thermal load prediction and oil life preservation goals.

Oil life preservation may be performed, for example, by dropping the temperature of kitchen equipment such as a fryer to extend the lifetime of consumables such as fryer oil during periods when equipment is not in use, as determined by a kitchen production forecasting system.

Additionally, the present invention includes preemptively changing thermal input into the kitchen equipment before a thermal load is applied. For example, fryer gas burner can be turned on 20 seconds before a basket of frozen fries is dropped into fryer.

Preferably, control of the equipment is automated. In embodiments, a controller utilizes a camera or sensors to track workers in the kitchen to predict when food will be added to system. The controller raises or lowers the temperature of the appliance automatically based on the location and movement of the workers.

In embodiments, the controller is connected to a production forecasting system based on various inputs. Examples of input to the production forecasting system include, without limitation: prior demand, point-of-sale data, and product stock levels.

In embodiments, the controller is connected to a robotic kitchen assistant which relays its cooking cadence over to controller for predictive temperature control.

In embodiments, the computer monitors the health of the kitchen equipment by observing effect of heat input on temperature readouts when equipment has no thermal load.

In embodiments, the robot is operable to skim contents out of the fryer to preserve the lifetime of the equipment and the oil.

In embodiments, the system determines optimum lifetime of the oil, and when the oil needs to be changed based on tracking the throughput of food cooked in the fryer.

Robotic Food Packing System

Figure 13:
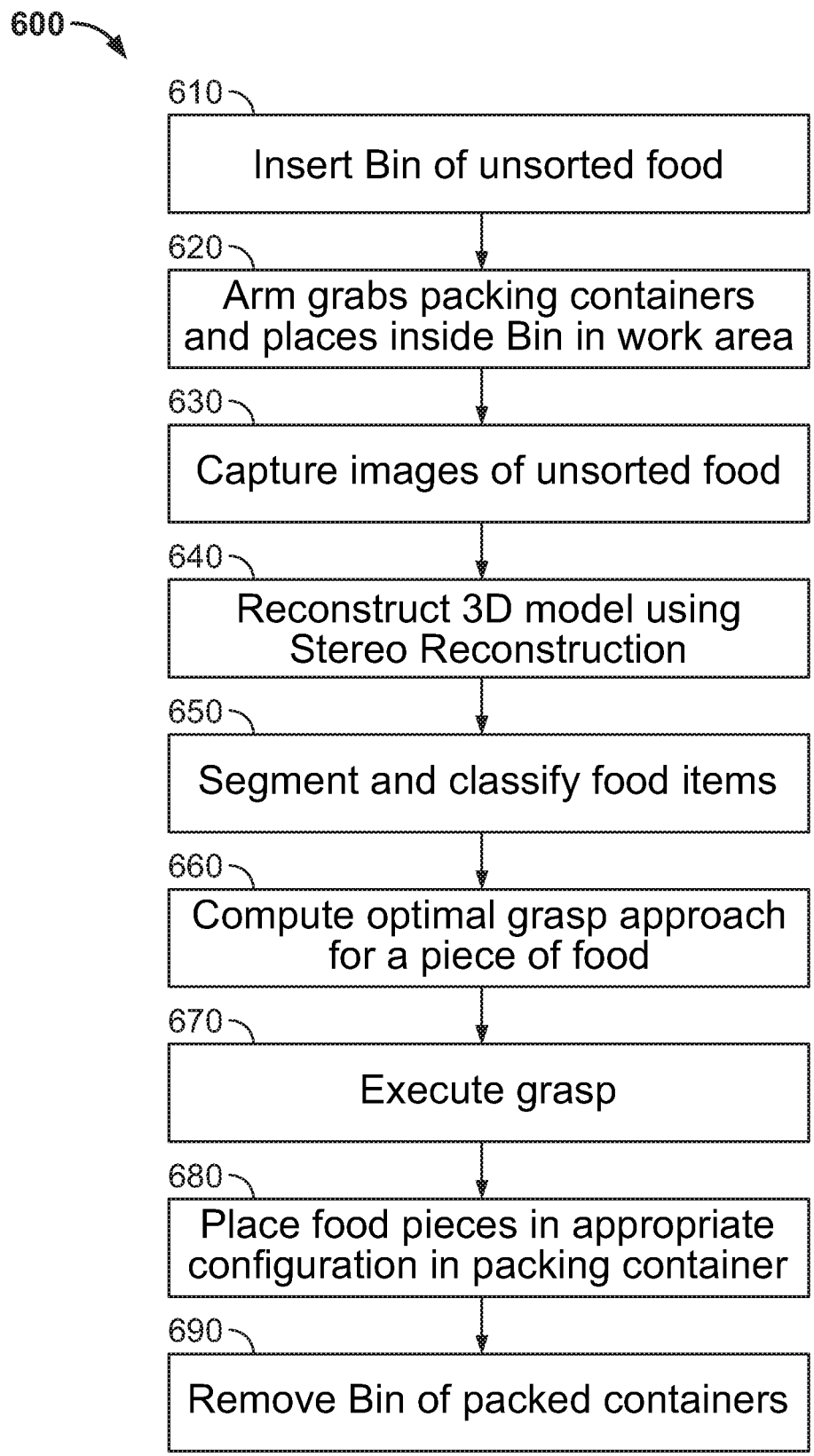
FIG. 13 is a flow chart illustrating an operational procedure for packing a food container in accordance with an embodiment of the invention.

FIG. 13 shows an operational procedure 600 for packing a food container. For facilitating understanding of the invention, the procedure set forth in FIG. 13 will be discussed with reference to the apparatus shown in FIGS. 14-15B.

Figure 14:
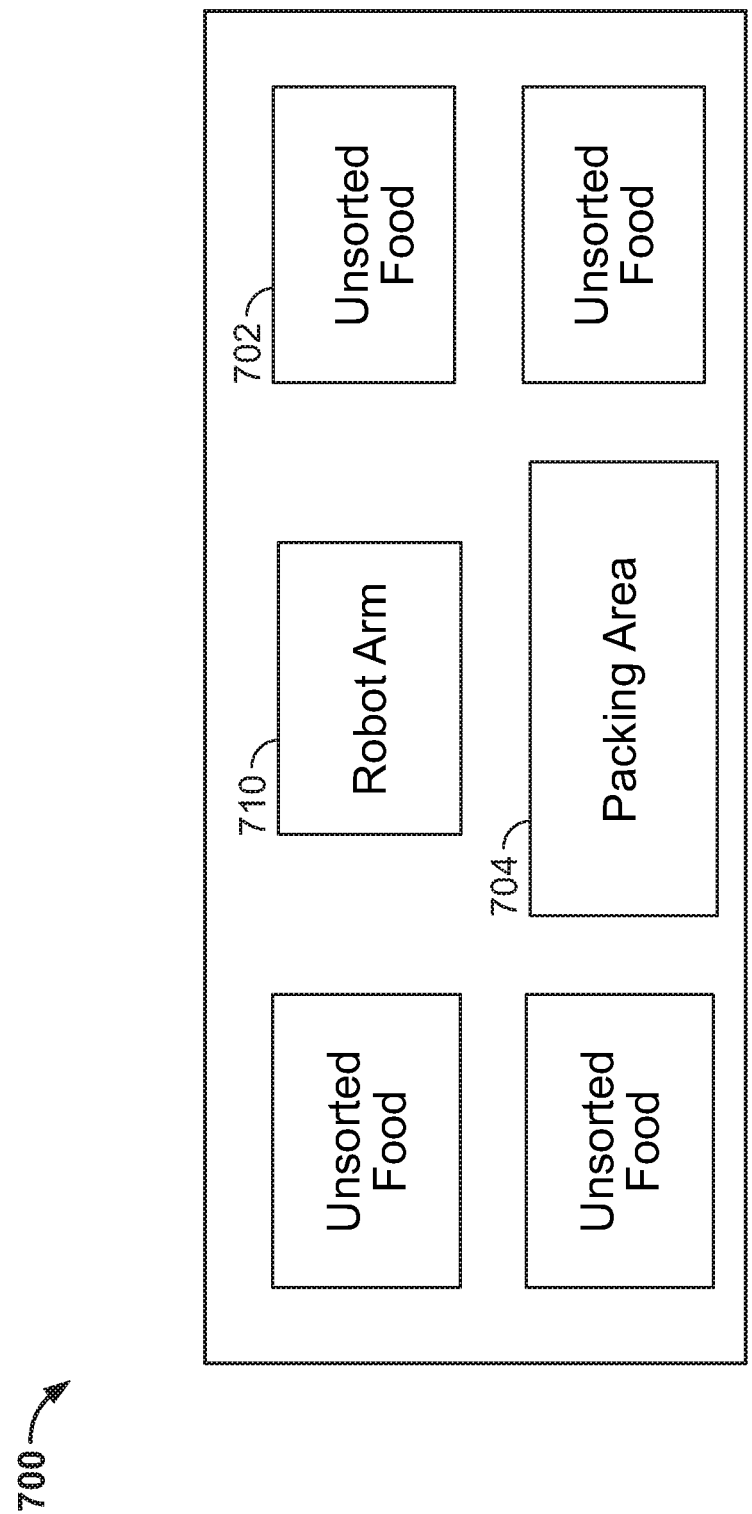
FIG. 14 shows an overhead view of a robotic food packing system in accordance with an embodiment of the invention where the unsorted food boxes represent locations where bins of unsorted food are placed and the packing area is a work area where packing containers can be placed while they are being packed.

Step 610 states to insert bin of unsorted food. With reference to FIGS. 14-15B, one or more bins of unsorted food 720 are placed in the unsorted food area 702 within the workspace of the modular packing cart 700. The unsorted work areas 702, and bines of unsorted food 720 are within arm's reach of the robotic arm 710. Optionally, the system interfaces with either a human kitchen worker or another robotic kitchen assistant to place the bins or unsorted food in the unsorted food area 720.

Step 620 states to place at least one packing container 730 inside packing area 704. In embodiments, one bin sits in the work area to be used for packing. Another bin sits in the work area and contains packing containers. However, the number of the bins and areas may vary.

Step 630 states to capture images of the unsorted food. The cameras or sensors 760, described herein, can be arranged above the worksurface and food items or elsewhere to aim at and obtain images from multiple angles of the unsorted food. With reference to FIG. 15B, the locations of the overhead cameras 760 in the camera array are placed above the worksurface. Placing cameras in these locations allows the system to perceive the contents of Bins with high accuracy.

Indeed, in order to properly portion and plate or pack a container, a Robotic Food Packing System can see in 3D the objects inside a bin of unsorted food. This 3D imaging data can then be used to drive decisions, discussed herein, on how and what to pick out of the bin of unsorted food. High fidelity 3D vision in a Robotic Food Packing System is achieved with an array of optical cameras mounted above the Working Surface of the Cart. These cameras point at the various work areas as in FIG. 14.

Step 640 states to reconstruct the 3D model. Preferably, as discussed above, stereo reconstruction is employed for this step.

Step 650 states to segment and classify the food items. This step may be carried out as described above.

Step 660 states to compute an optimal grasp approach for a piece of food. This step may be determined and carried out based on parameters of the end effector tool 770 and the robot arm 710, and the output from step 650.

Step 670 states to execute grasp.

Step 680 states to place food pieces in appropriate configuration in packing container 730. This step is executed by the robotic arm, and based on order information. In embodiments, pick and place is achieved using computer vision. Images are captured by video cameras and processed by convolutional neural networks. Such a network involves a series of convolutional layers and max pool layers as well as other layers. These neural networks can be trained to infer the optimal angle of approach and determine the path necessary to successfully pick up an object.

Step 690 states to remove bin of packed containers. Optionally, similar to step 610, the system is operable to interface with either a human kitchen worker or another robotic kitchen assistant to remove the bin of packed food containers from the packing area 730.

As mentioned herein, the workspace of the modular cart may be shielded to protect workers. In embodiments, and with reference to FIG. 15A, transparent windows 780 can be incorporated into the cart, rising from the waist-level work surface to prevent kitchen workers from interacting unsafely with the system.

Figure 16:
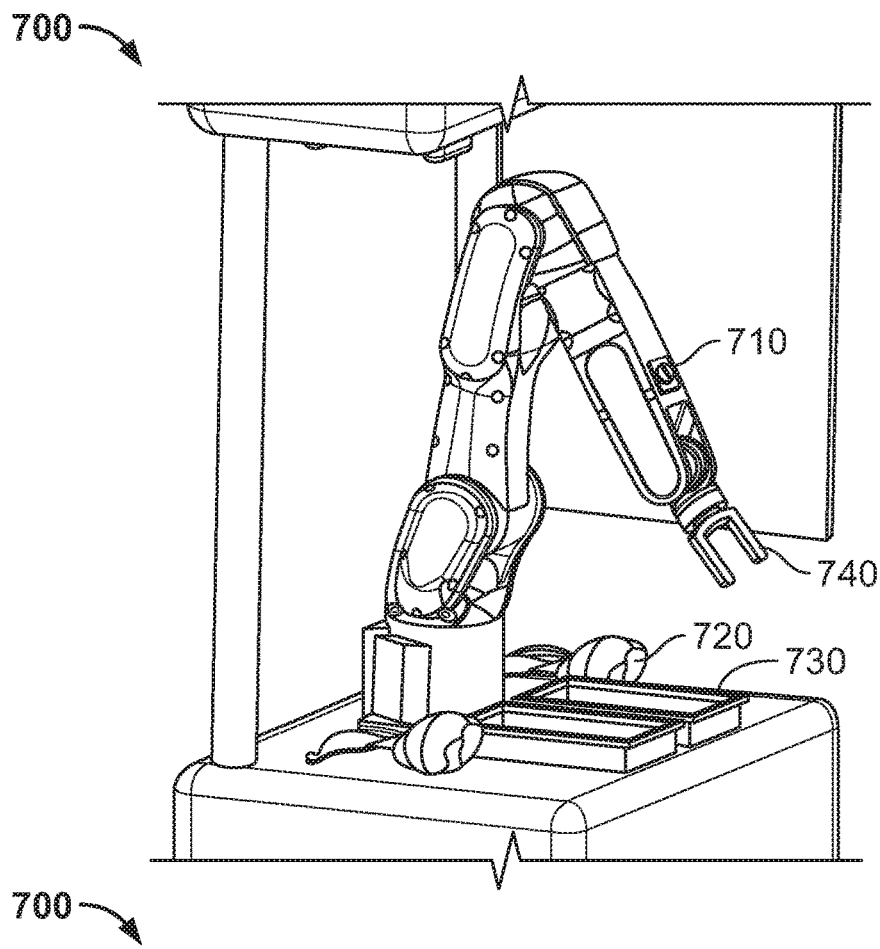
FIG. 16 shows a robotic arm with an opposable gripper capable of picking up a variety of food items in accordance with an embodiment of the invention.
Figure 17:
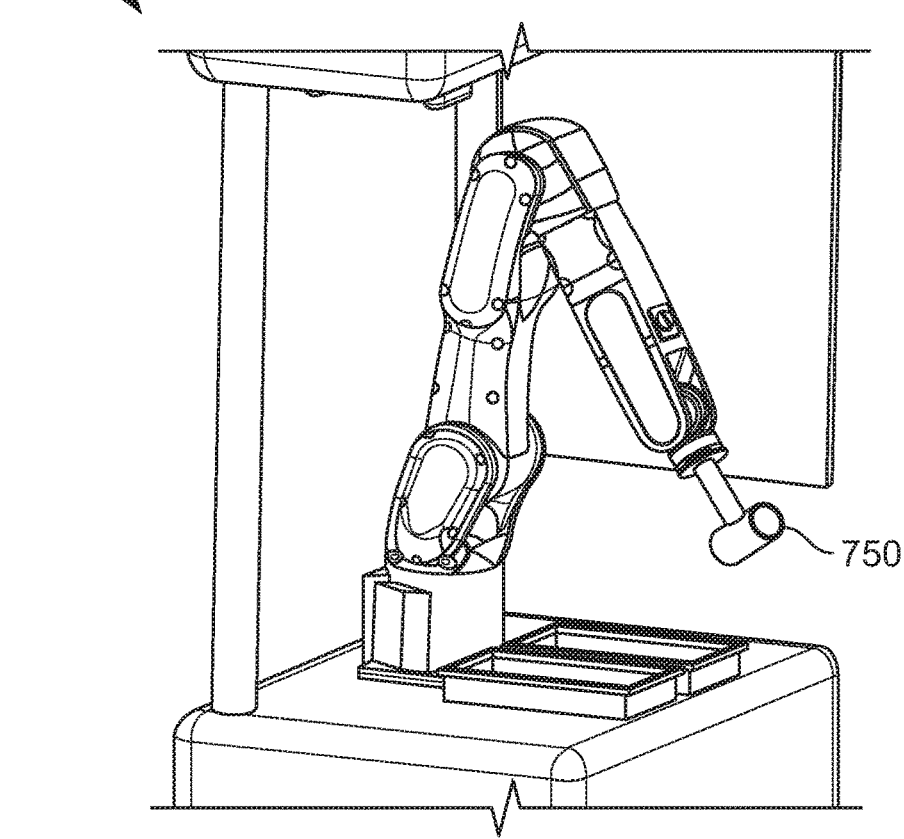
FIG. 17 shows a measuring tool that is capable of using a variety of measuring tools for liquid and powders in accordance with an embodiment of the invention.

In embodiments, various types of gripping, grasping, wedging, squeezing, clamping, scooping, ladling, skewering, and suctioning tools are used to pick up one or more pieces of food. With reference to FIG. 16, for example, the robotic arm 710 may be provided with an opposable gripper 740 capable of picking up a variety of food items. Alternatively, with reference to FIG. 17, the robotic arm may be provided with a measuring tool 750 that is capable of using a variety of measuring tools for liquid and powders.

In embodiments, sorting and packing is performed with a gripper tool attached to the end of a robot arm. The robot arm can have 4, 5, 6, 7, or more degrees of freedom. Additionally, the robot can have other configurations including but not limited to, a SCARA or delta-type robot.

In embodiments, the robot arm may have a camera on the wrist. The data from this camera can be combined with the data from other cameras to improve the accuracy of pick and place behaviors. In embodiments, the wrist imaging sensor may be RGB, IR, or depth, or some combination of these sensors.

In embodiments, a convolutional neural network is sometimes used to identify packing containers, either in a stack or set out in preparation for packing.

In embodiments, the decision on what and how to pack is driven by external data coming in via sensors and the Internet. Packing contents are determined by recipes.

In embodiments, learning by demonstration is sometimes used to build a model for picking up food items. A human expert goes through the motions of picking up many examples of a food item or various food items. These data can be used to train a model to pick up various food objects.

In embodiments, reinforcement learning (trial and error) is used. In this process, the system makes repeated attempts at picking up food objects. The system uses these attempts to refine the grasping model and eventually the system learns to grasp a variety of objects consistently.

In embodiments, learned models for grasping are shared amongst numerous robots potentially with a wide geographic distribution.

Smart Robotic Kitchen

As discussed herein, the modular robotic kitchen system includes modular carts, appliances, and transports operable to interact and communicate with one another to deliver and prepare food according to an optimal schedule and with limited waste.

Figure 20:
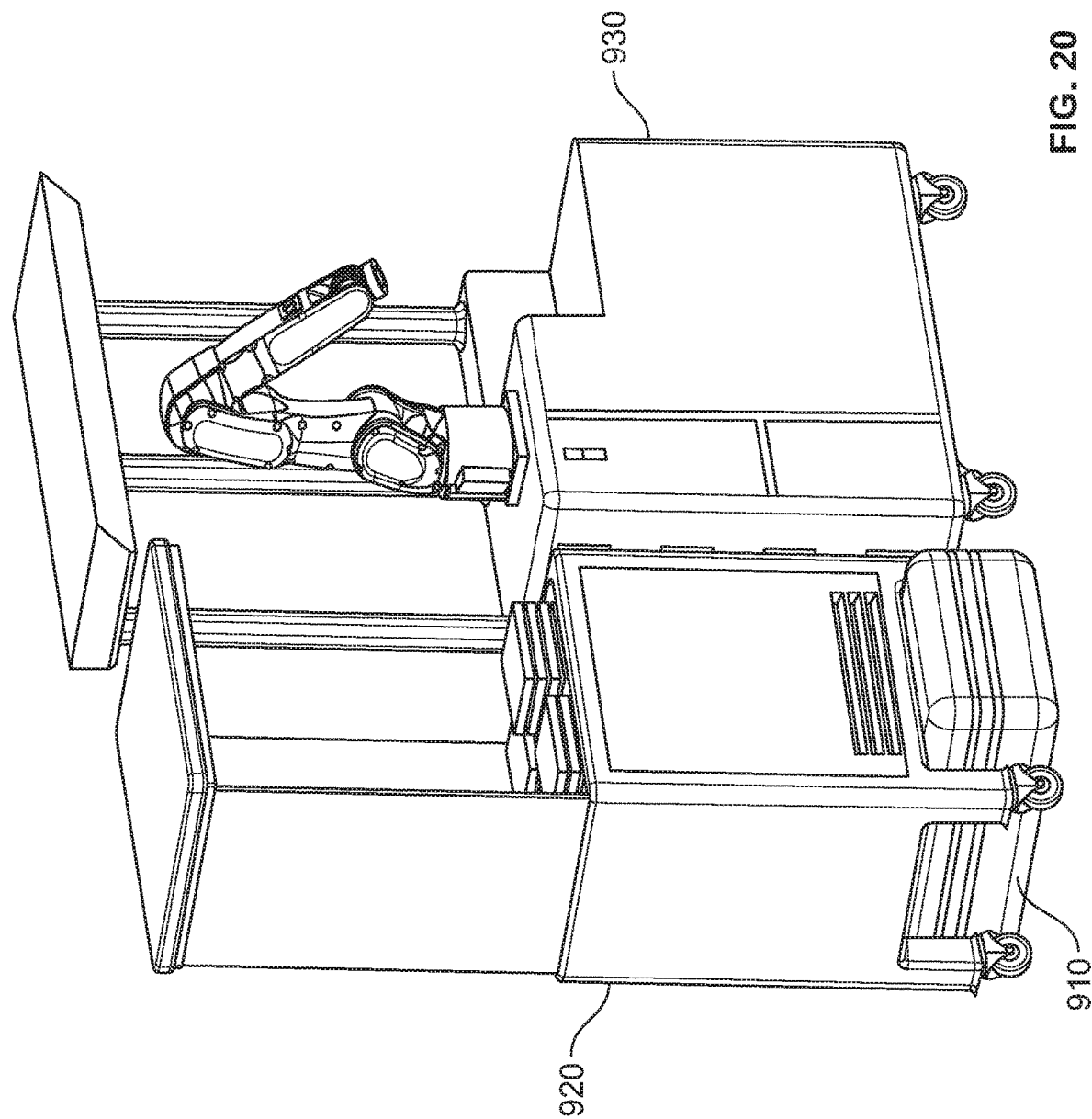
FIG. 20 shows a mobile robot transporting food between modular units in accordance with an embodiment of the invention.

With reference to FIG. 20, a mobile robot 910 is shown moving a supply cart 920 of food containers to robotic modular unit 930 in accordance with an embodiment of the invention. In this manner, food supplies can be provided automatically and without human interaction. Further, the robotic arm of module 930 is operable to pick up and distribute the supplies as determined by the scheduling engine discussed herein.

Food Quantity Sensors

Figure 21:
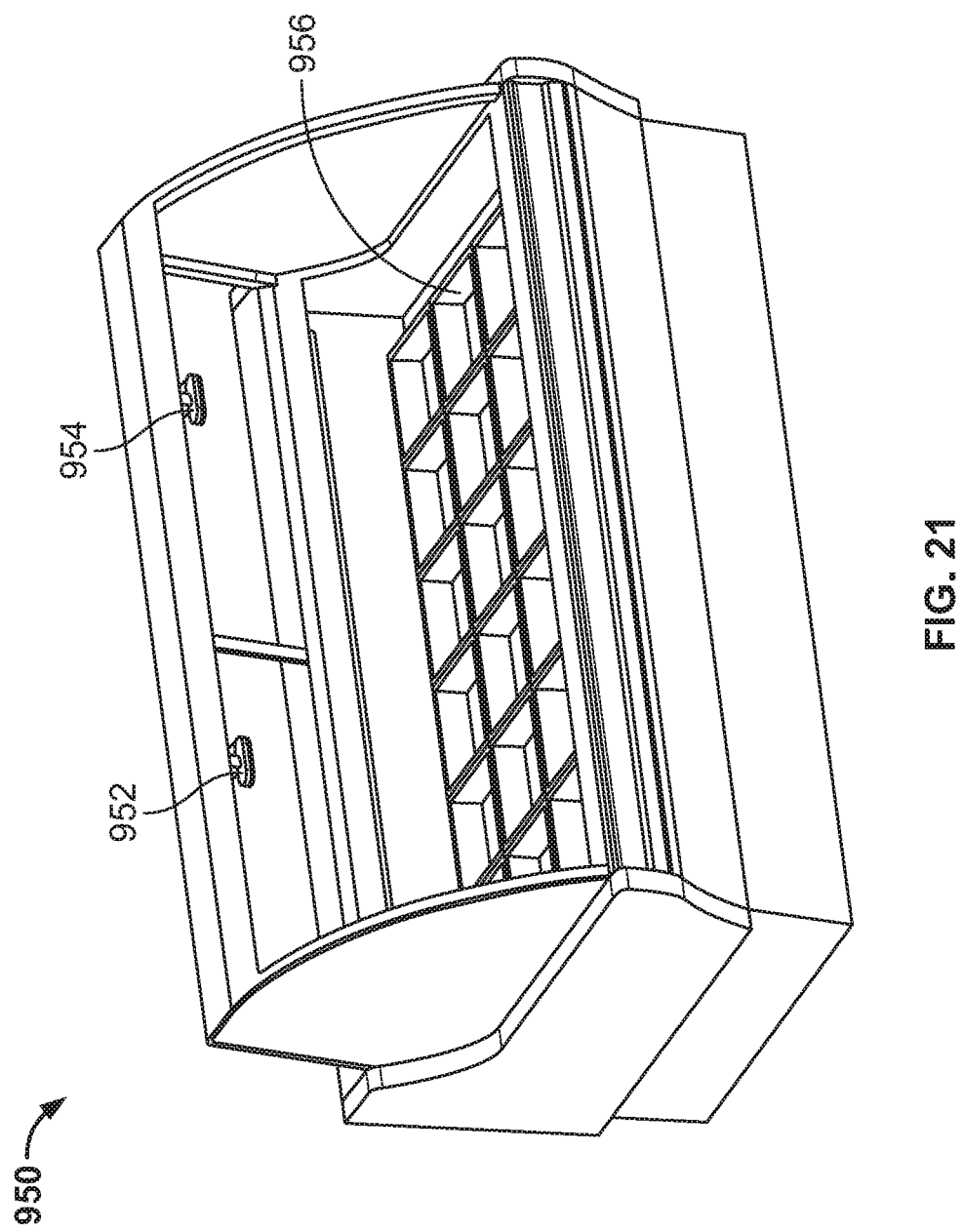
FIG. 21 shows a hot case, and sensors mounted thereon to observe the contents of the hot case to estimate the available quantity of food remaining in accordance with an embodiment of the invention.

With reference to FIG. 21, a hot case 950 having sensors 952, 954 is shown. The sensors are mounted such that the contents of the hot case may be observed to estimate the available quantity of food remaining in accordance with an embodiment of the invention. In embodiments, the sensor module is used to approximate the amount of food remaining in a hot case. This module provides data about remaining food in a hot case to a central computer or computer for computing scheduling food preparation steps. Also, by 'hot case', it is meant a food station that contains unpackaged food that can be accessed by customers directly from the hot case.

The configuration of the hot case may vary. The hot case 950 shown in FIG. 21 includes a plurality of separate spaces to receive separate containers 956. In embodiments, the spaces are operable to warm (or maintain the temperature) the containers placed therein. However, it is to be understood that the subject invention may include station for cooling food. Indeed, a station may present for pickup or access food, whether temperature controlled or not, to the customers. In embodiments, a sensor module comprises one or more sensor from RGB cameras, IR cameras, depth sensors, or any other imaging sensor.

Additionally, in embodiments, the contents of a hot case is shared with other participants in the robotic kitchen (and sometimes also with a main controller or computer) upon which scheduling decisions (e.g., scheduling the food preparation steps) are determined.

Figure 22:
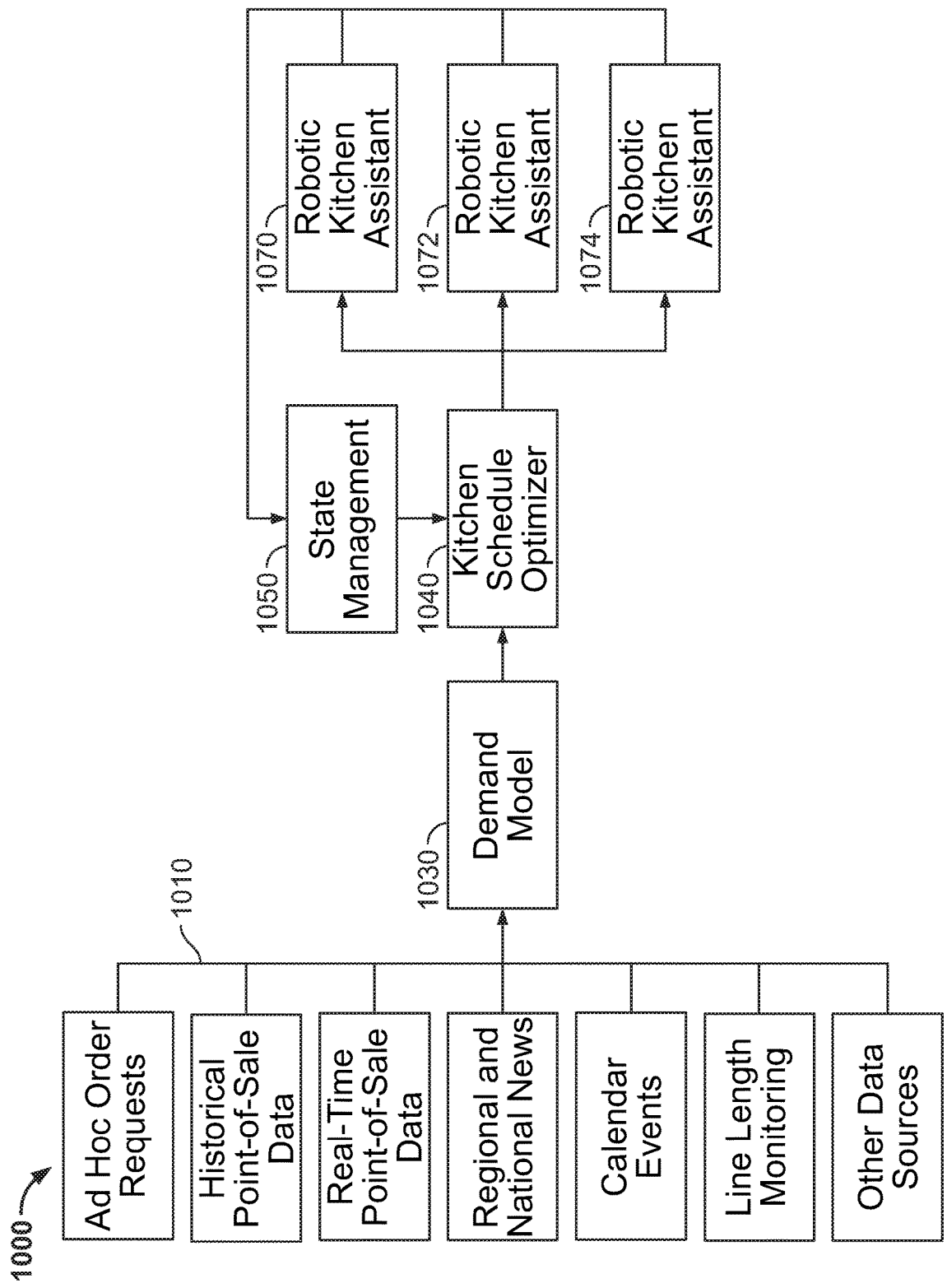
FIG. 22 is a flow chart for a method to control the actions of various robotic kitchen assistants in a robotic kitchen in accordance with an embodiment of the invention.

FIG. 22 is a flow chart for a method 1000 detailing data flow and inputs 1010 in a system that drives a demand model 1030 is then used with a scheduler 1040 to control the actions of various Robotic Kitchen Assistants 1070, 1072, 1074 in a Smart Robotic Kitchen 1000 in accordance with an embodiment of the invention.

Step 1030 states demand model. Inputs 1010 to the demand model shown in FIG. 22 include: ad hoc order requests, historical point of sale (POS) data, real-time POS data, regional and national news, calendar events, line length, and other data sources. Still other data sources may be provided as inputs 1010 including, e.g., a quantity sensor data. The quantity sensor can feed the demand model as described above in connection with FIG. 21. Additionally, in embodiments, historical quantity measurements from many food quantity sensors can be aggregated and used to improve the accuracy of demand prediction leading to a reduction in food waste.

Step 1040 states schedule optimizer. An exemplary scheduling engine is described in US Patent Publication No. 20180345485, entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS." In embodiments, a central controller aggregates data to drive scheduling decisions for the entire Smart Robotic Kitchen.

In embodiments, Just-in-Time production scheduling is implemented using data from all participants in the Smart Kitchen and drives mechanical devices to produce.

The scheduler then directs or instructs one or more robotic kitchen assistant 1070, 1072, 1074 to perform the various food preparation tasks as described herein.

FIG. 22 also shows state management 1050. State management serves to monitor the state of all tasks of modular robotic kitchen system including for example, current inventory, current preparation step, current state of all items cooking, predicted demand model, executing tasks for robotic systems, and executing tasks of staff. The state management system can allocate tasks to the staff and automation systems to optimally achieve a predicted demand model. This optimization is updated multiple times a minute when the state of the system is updated as food continues to cook, employees succeed or fail in accomplishing tasks, and new orders get placed. An example of a state management system is described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS", U.S. patent application Ser. No. 16/490,775, filed Sep. 3, 2019, entitled "AUGMENTED REALITY-ENHANCED FOOD PREPARATION SYSTEM AND RELATED METHODS", and US Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", each of which is incorporated by reference in its entirety for all purposes.

Figure 23:
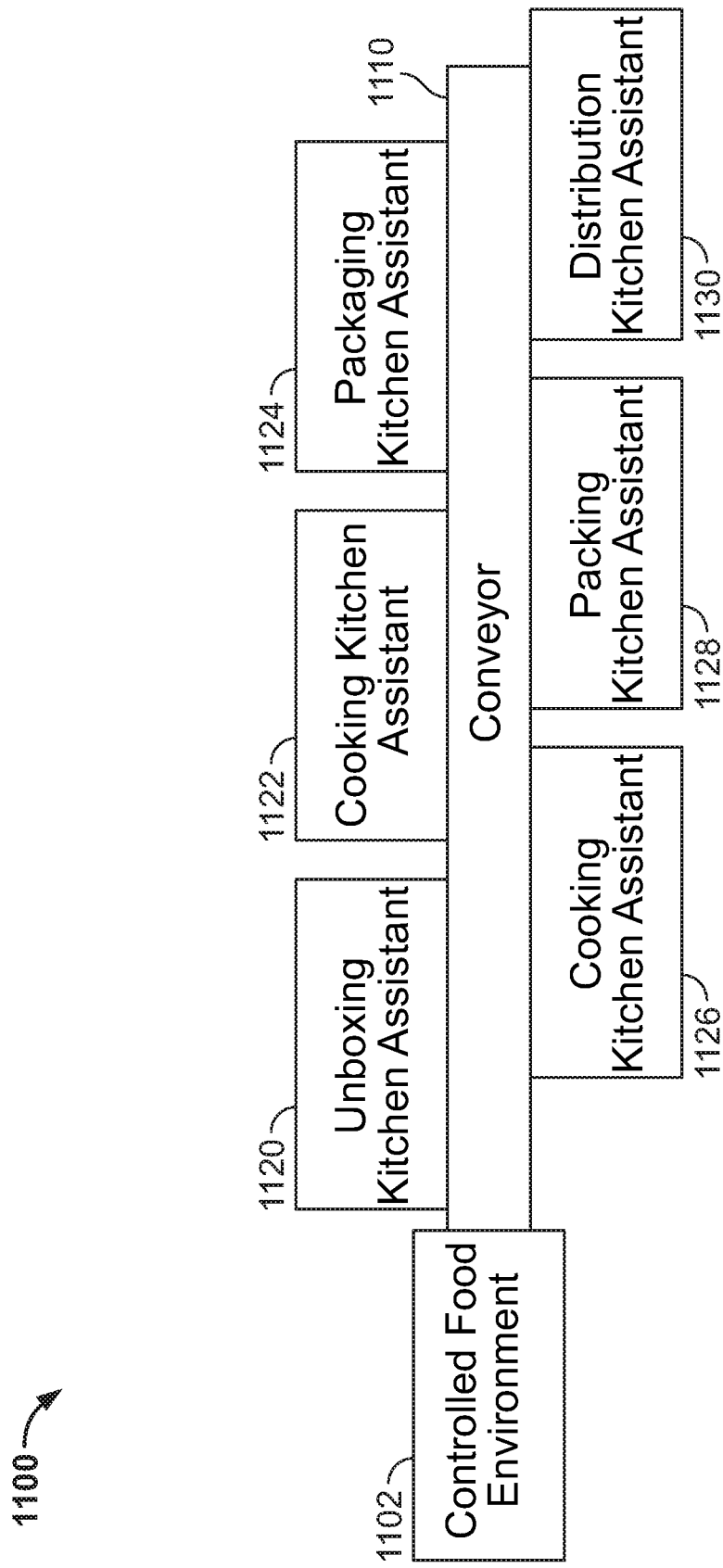
FIG. 23 is a block diagram of a conveyor system for routing food between two or more robotic kitchen assistants in accordance with an embodiment of the invention.

FIG. 23 is block diagram robotic kitchen system 1100 including a conveyor system 1110 in accordance with an embodiment of the invention. The conveyor 1110 is set up to route objects between from a controlled food environment (e.g., a walk-in refrigerator, storage, vehicle) and two or more modular robotic kitchen unit as described herein. The modular robotic units shown in FIG. 23 include an unboxing robotic kitchen assistant 1120, cooking robotic kitchen assistants 1122, 1126, packaging robotic kitchen assistant 1124, packing robotic kitchen assistant 1128, and a distribution robotic kitchen assistant 1130. However, it is to be understood that the number of modular kitchen assistants may vary and be adjusted to suit the kitchen application. An additional modular robotic kitchen cart may be conveniently moved into position and the system is programmed to operate with the additional modular cart as described herein.

In embodiments, the conveyor belt assembly comprises a belt, an enclosure surrounding the belt. The enclosure acts as a protective shield to protect moving parts of the conveyor from the food. Additionally, each food item is prepared on a magnetic tray. In embodiments, the conveyor belt has a series of magnets on it. The conveyor is operable to move the magnetic food tray from underneath the protective barrier through a magnetic force.

In embodiments, the conveyor system can include one or more sensors. For example, a sensor module can be arranged on one or more of the carts to obtain image data, or time of flight sensing. The sensor module optionally includes one or more CPUs and GPUs. A processor can be provided that is operable to run convolutional neural networks and geometric analysis of 3D data achieved through stereographic reconstruction, time-of-flight sensing, or other methods.

Novel Fry Basket

A robotic-friendly fry basket 800 for improved packing efficiency and safety, and reduced payload on humans is shown in FIGS. 18-19.

FIG. 18A shows a basket design 800 with computer vision (CV) marker mount plate 810 and diamond-shaped gripping feature 820. The marker mount facilitates location of the basket in 3D space, and the gripping feature makes it easier for the robot arm to pick up the fryer basket despite tolerance stacking errors. Examples of the CV marker and gripping feature are described in U.S. patent application Ser. No. 16/534,207, filed Aug. 7, 2019, and entitled "ROBOTIC KITCHEN ASSISTANT INCLUDING UNIVERSAL UTENSIL GRIPPING ASSEMBLY", incorporated herein by reference in its entirety for all purposes.

FIG. 18B shows a basket design with T-shaped feature 860 on top of basket to add more vertices to the object with sharp edges. In embodiments, the basket is designed with features that add additional sharp vertices for computer vision to pick up on. In embodiments, a fryer basket has additional sheet metal features with sharp gradients to enable easy detection and localization via machine learning and traditional classifier algorithms (see Viola-Jones-type classifiers and AlexNet for examples of what is detectable algorithmically via computer vision https://www.cs.cm-u.edu/~efros/courses/LBMV07/Papers/viola-cvpr-01.pdf).

FIG. 19 shows a basket design with implement 870 for easy dumping of basket without lifting full weight of basket. The basket 850 is shown having an inverted hook 852 on the front to engage with a horizontal bar 870 on a workspace as a pivot. This enables the basket to be dumped without lifting the entire weight of the basket. In embodiments, the basket has a handle 820 for a robot and a separate handle 854 for a human. Consequently, the basket handle is designed in a way that both a human and a robot can grab the same handle.

Some of the advantages of the basket described above includes enabling a method for containing food for cooking in a fryer while enabling computer vision localization of basket; reducing time required to clean after use; and protecting the human worker. Additionally, in embodiments, smaller baskets are provided and used with the modular robotic system. Maintaining packing efficiency in a fryer while decreasing payload requirements can be accomplished by using many smaller baskets.

Alternative Embodiments

Figure 24B:
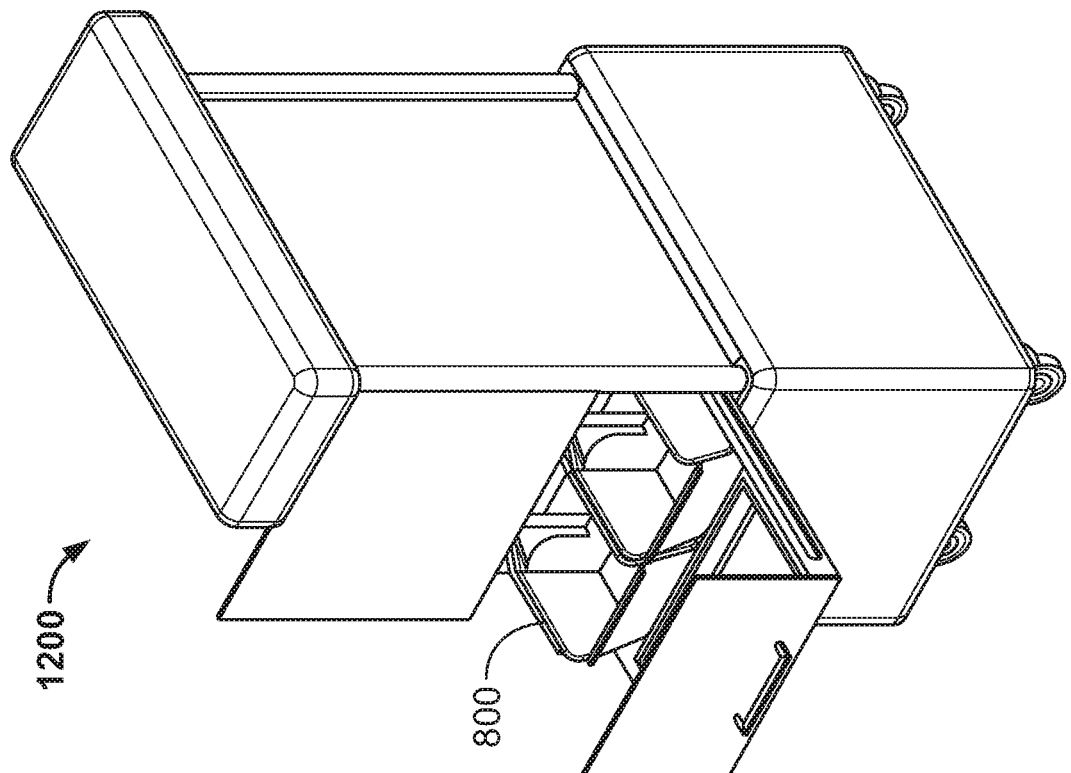
FIGS. 24A, 24B show a modular robotic kitchen unit comprising a human-robot drawer interface in closed configuration and open configuration, respectively, in accordance with an embodiment of the invention.
Figure 24A:
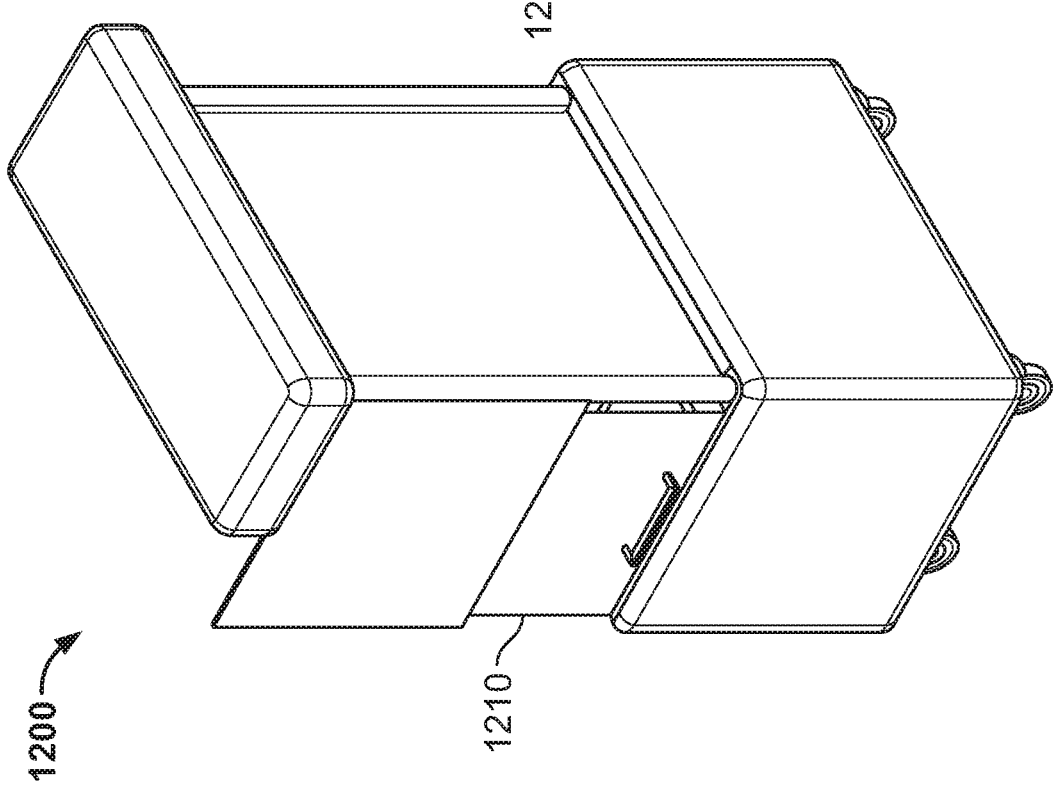

It is to be understood that the modular robotic kitchen system may vary widely except as recited in the appended claims. For example, in another embodiment, and with reference to FIGS. 24A, 24B, a modular robotic cart 1200 is shown including a drawer 1210 which grants access to the robotic arm within the shielded workspace 1220, and which limits access to the human worker. In contrast, when the drawer is in the open configuration 1210', the robotic arm is prohibited from accessing the drawer, and the human worker has access to add or remove contents. In a sense, the novel drawer design provides a safe human-robot interaction interface to supply and withdraw food items to the robotic modular cart.

In embodiments, the modular cart may contain a tool belt to hold a variety of tools including measuring tools, gripping tools, and calibration tools.

In embodiments, the modular cart may have several fixed fiducial markers to provide constant feedback on calibration accuracy and allow instantaneous calibration.

Figure 25:
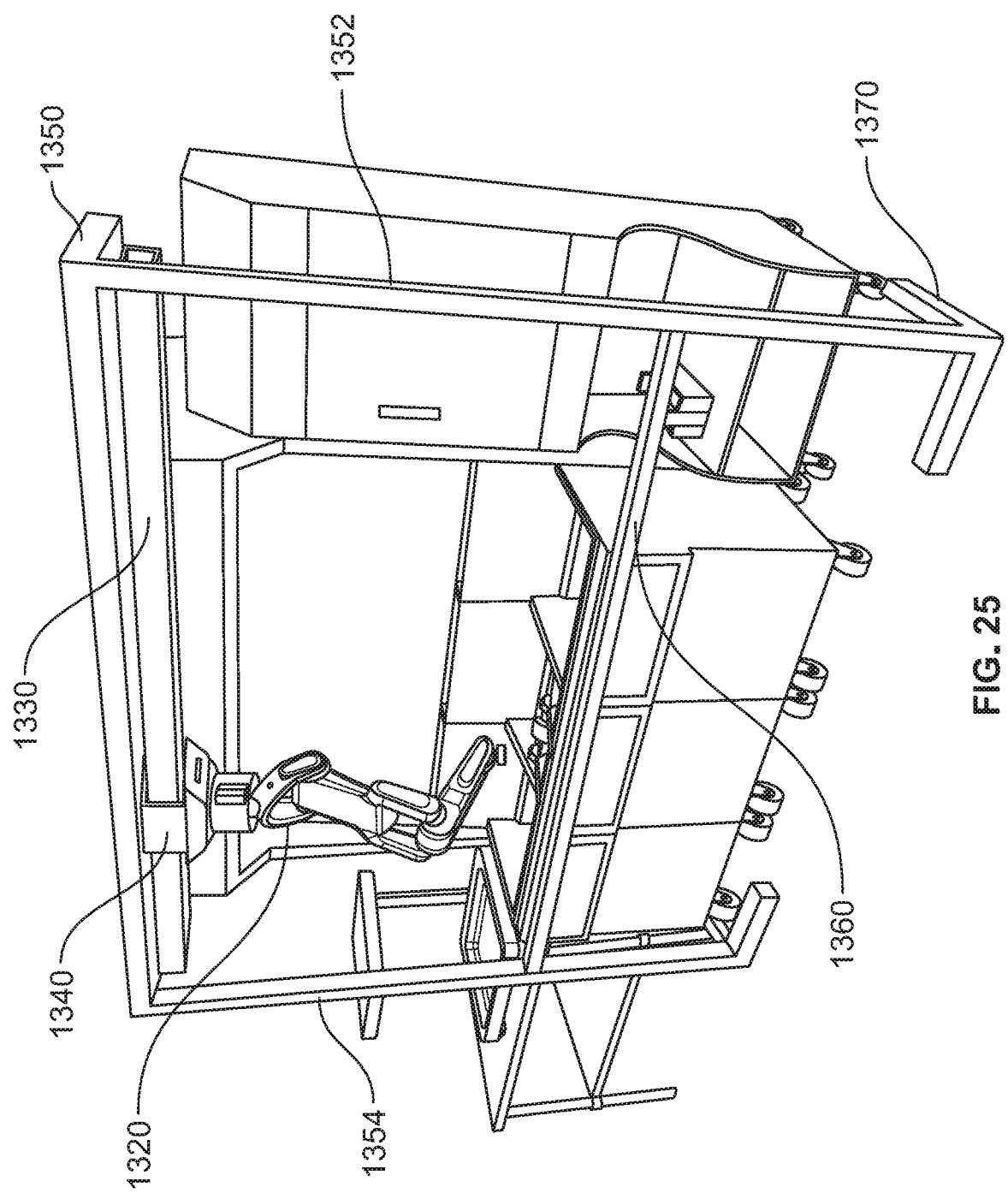
FIG. 25 shows a robotic linear guide rail system mounted on a frame above the cooking area in accordance with an embodiment of the invention.

In embodiments, and with reference to FIG. 25, one or more of the modular robotic arm modules described above may be replaced (or supplemented) with a frame-mounted linear guide system.

In the embodiment shown in FIG. 25, a robotic arm 1320 is shown coupled to an upper guide rail 1330 via movable base carriage 1340. The upper guide rail is mounted to a portable frame 1350. In the embodiment shown in FIG. 25, the frame 1350 comprises support legs 1352, 1354 and at least one cross beam 1360 upon which the upper guide rail is fastened.

Feet 1370 are shown extending from the legs at right angles from the legs for stability. Optionally, the feet may be mounted to the floor.

The carriage and guide cooperate together to axially move the robotic arm along the guide when commanded to do so by the computer processor, which may be located locally, as described above.

Although the linear guide system shows one robotic arm, the invention is not so limited except where recited in the appended claims. The linear rail guide system may include additional robotic arms movable along the rail to further increase the effective reach of the robotic arms. The computer and sensors operate together to determine the food preparation steps, recognize and locate the food items and utensils, and to schedule and carry out the order efficiently.

Additionally, the linear guide system may be oriented variously. In embodiments, a linear guide system extends from the front towards the back (or from the top to bottom) of the cooking area. In addition to such axial motion, the robot manipulator itself enjoys several other degrees of motion (multi-axis). Consequently, the linear guide systems can perform any of the skills and applications described above such as those identified in FIG. 5.

The linear movement may be generated using a number of different linear movement systems. In embodiments, a cleanable linear actuator design extends the reach of one or more manipulators. In one embodiment, the linear actuator is composed of a ball screw mechanism with thread and pitch size large enough to easily clean between the threads.

The frame may be made of various materials. In embodiments, the frame is formed of steel tubing, welded together.

Additionally, the linear actuator may be covered to protect it. In embodiments, a barrier is shaped to cover the sliding mechanisms from any splashes from food production. A cover allows access of the carriage to move freely along the rail.

Still other techniques may be employed by the robotic kitchen assistant to automatically remove debris from the fryer including rapidly contacting the rim of a trash receptacle with the skimmer, or brushing the skimmer with a tool.

The invention claimed is:

1. A modular robotic kitchen system for preparing food items in combination with at least one kitchen appliance in a commercial or restaurant kitchen, the modular robotic kitchen system comprising:
   a main kitchen module, the main kitchen module comprising a cart, a first robotic arm arranged on the cart, and a shielded workspace;
   at least one sub kitchen module, wherein each of said at least one sub kitchen module comprises a cart and a shielded workspace, and wherein each sub kitchen module being arranged within reach of the robotic arm and selected from the group consisting of an ingredient unit, assembly unit, packaging unit, and pick-up unit;
   a sensor array,
   a central processor operable to compute and provide directions to the first robotic arm to prepare a food item using any one or more of the sub kitchen modules in combination with the kitchen appliance; and
   a temperature probe, and
   wherein the central processor and sensor array are operable to automatically locate and specify a candidate food item to test with the temperature probe based on volume, and to compute an angle of approach and penetration depth relative to the surface of the candidate food item for the robotic arm to aim the temperature probe, and based on the type of food item being tested.

2. The modular robotic kitchen system of claim 1, wherein the at least one sub kitchen module comprises the ingredient unit located adjacent the main module, and the ingredient unit adapted for holding multiple food items in separate areas accessible by the robotic arm, wherein at least one separate area is temperature controlled.

3. The modular robotic kitchen system of claim 2, further comprising an assembly unit for assembling a completed entrée, the assembly unit comprising work surface, the work surface having a designated unsorted food area and an assembly area for plating or packaging a completed entree, and the assembly unit further comprising at least one sensor aimed at the work surface and which is operable to send data to the central computer.

4. The modular robotic kitchen system of claim 3, further comprising a pick-up unit for storing the completed entrée until customer pickup, wherein the pick-up unit is temperature controlled.

5. The modular robotic kitchen system of claim 4, wherein the first robotic arm of the main module operates to perform cooking with the kitchen appliance, and the modular robotic kitchen system further comprises an RKA extension module comprising a second robotic arm, and operable to perform at least one of skill selected from the group consisting of unpacking with an ingredient unit, cooking with the kitchen appliance, packing with a packaging unit, and assembling with the assembly unit.

6. The modular robotic kitchen system of claim 1, further comprising a freezer-safe package configured to enclose a food item, and to open along a seam when the package is bowed/bent by the robotic arm, thereby allowing the food item to fall from the package.

7. The modular robotic kitchen system of claim 1, wherein the kitchen appliance heats the food item, and the central processor is operable to monitor and control the temperature of the kitchen appliance.

8. The modular robotic kitchen system of claim 1, wherein the at least one sub module is mobile.

9. The modular robotic kitchen system of claim 1, further comprising a scheduling engine to determine a sequence of food preparation steps using the main and sub modules and based on a plurality of inputs selected from the group consisting of camera data, customer orders, inventory, and recipe information.

10. The modular robotic kitchen system of claim 9, wherein the scheduling engine applies an optimization algorithm to determine the schedule of the food preparation steps.

11. The modular robotic kitchen system of claim 9, further comprising a food quantity sensor operable to detect quantity of food, and wherein the quantity of food is an input to the scheduling engine.

12. The modular robotic kitchen system of claim 1, wherein the main module comprises a drawer slidable from a first position outside of the shielded workspace and inaccessible to the robotic arm, and a second position within the shielded workspace accessible to the robotic arm.

13. The modular robotic kitchen system of claim 1, further comprising a conveyor belt assembly for transporting food items between the main module and the at least one sub module.

14. The modular robotic kitchen system of claim 13, wherein the conveyor belt assembly further comprises a belt, an enclosure surrounding the belt, and magnets underneath the belt to hold food items in a position fixed relative to the surface of the belt.

15. The modular robotic kitchen system of claim 1, further comprising a demand engine to compute a quantity of food items to be prepared based on at least one of the following inputs selected from the group consisting of time and date, inventory, and cooking time.

16. The modular robotic kitchen system of claim 1, wherein the temperature probe comprises a flange and a tip operable to extend beyond the flange to penetrate the food item, and wherein the tip can be retracted such that the flange contacts the food item to detach the food item from the tip.

17. A method of robotically preparing food items in a commercial or restaurant kitchen having at least one kitchen appliance for cooking a food item, the method comprising:
providing a main robotic cart, the main robotic cart comprising a robotic arm and shielded workspace;
providing a plurality of discreet sub carts, each of said plurality of sub carts having a shielded workspace;
arranging the main robotic cart and the plurality of sub carts around the main robotic cart and at least one kitchen appliance such that robotic arm can access and reach the at least one kitchen appliance and the shielded workspace of each sub cart;
identifying and locating, with at least one camera, at least one food item from a temperature controlled bin in a first sub cart of the plurality of sub carts;
picking, with the robotic arm, the at least one food item from the temperature controlled bin from the first sub cart and transferring the at least one food item to the kitchen appliance for cooking;
cooking the at least one food item;
measuring, with a temperature probe arranged on the robotic arm, the internal temperature of at least one candidate food item of the at least one food item during the cooking step, wherein the measuring comprises:
computing an optimal angle of approach and penetration depth of the temperature probe relative to the surface of the at least one candidate food item based on the type of the at least one candidate food item;
advancing the temperature probe into the at least one candidate food item based on the optimal angle of approach and the optimal penetration depth;
removing, with the robotic arm, the cooked at least one food item from the kitchen appliance and transferring the cooked at least one food item to a second sub cart of the plurality of carts;
assembling, with the robotic arm, the cooked at least one food item with other ingredients according to a customer order on the second sub cart to obtain a completed entrée; and
storing, by transferring with the robotic arm, the completed order to a third sub cart of the plurality of sub carts for safe storage at a controlled temperature until pickup.

18. The method of claim 17, further comprising robotically packaging, with the robotic arm, after the step of assembling and prior to the step of storing, the completed entrée at a fourth sub cart of the plurality of sub carts to create a packaged order for pickup.

19. The method of claim 18, further comprising providing a second kitchen appliance, and programming the robotic arm to be operable with a second kitchen appliance for cooking.

20. The method of claim 18, further comprising providing a second kitchen appliance, and an extender sub cart and a second robotic arm, wherein the method further comprises programming the second robotic arm to be operable with the second kitchen appliance.

21. The method of claim 20, further comprising determining, using a programed processor, a set of food preparation steps for the first and second robotic arms to prepare the completed entrée.

22. The method of claim 21, further comprising determining, using the programed processor, a schedule for the food preparations steps.

23. The method of claim 22, wherein the step of determining the set of food preparation steps and the schedule of the food preparation steps is based on a downloaded recipe, customer order, predicted demand, and inventory.

24. The method of claim 17, wherein the at least one food item comprises a plurality of food items, and the method comprises determining said at least one candidate food item based on evaluating the volume of each food item of the plurality.

25. The method of claim 17, further comprising sensing axial force as the temperature probe is advanced into the candidate food item.

26. The method of claim 17, wherein the computing steps are based on the homogeneity of the at least one food item.

27. The method of claim 26, wherein the computing steps are performed by a trained model.

* * * * *